United States Patent
Kino et al.

(10) Patent No.: US 8,860,405 B2
(45) Date of Patent: Oct. 14, 2014

(54) ANGLE SENSOR

(71) Applicant: Aisan Kogyo Kabushiki Kaisha, Obu (JP)

(72) Inventors: Hisashi Kino, Ichinomiya (JP); Ryojiro Kanemitsu, Obu (JP); Shinya Suzuki, Nagoya (JP); Kazuhiro Nakamura, Ichinomiya (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 202 days.

(21) Appl. No.: 13/645,021

(22) Filed: Oct. 4, 2012

(65) Prior Publication Data

US 2013/0271122 A1  Oct. 17, 2013

(30) Foreign Application Priority Data

Oct. 6, 2011 (JP) .................... 2011-222163
Oct. 6, 2011 (JP) .................... 2011-222206
Oct. 7, 2011 (JP) .................... 2011-222605

(51) Int. Cl.
*G01B 7/30* (2006.01)
*G01D 5/00* (2006.01)

(52) U.S. Cl.
CPC ... *G01B 7/30* (2013.01); *G01D 5/00* (2013.01)
USPC .................................. 324/207.25

(58) Field of Classification Search
None
See application file for complete search history.

(56) References Cited

U.S. PATENT DOCUMENTS

| 6,236,199 B1* | 5/2001 | Irle et al. ................. 324/207.17 |
| 2011/0109304 A1* | 5/2011 | Suzuki et al. ............. 324/207.25 |
| 2012/0007592 A1* | 1/2012 | Manabe et al. ............ 324/207.25 |

FOREIGN PATENT DOCUMENTS

| JP | A-8-136211 | 5/1996 |
| JP | A-8-292066 | 11/1996 |
| JP | A-9-229715 | 9/1997 |
| JP | A-2006-162577 | 6/2006 |
| JP | A-2008-197046 | 8/2008 |
| JP | A-2010-117225 | 5/2010 |
| JP | A-2010-237077 | 10/2010 |

\* cited by examiner

*Primary Examiner* — Minh N Tang
(74) *Attorney, Agent, or Firm* — Oliff PLC

(57) ABSTRACT

An angle sensor includes a sensor rotor formed with a planar coil and a sensor stator including a multi-X type planar coil placed to face a surface of the sensor rotor. On a stator substrate of the sensor stator are provided forward-direction planar coils and reverse-direction planar coils, and positive and negative terminals adjacently arranged. The forward-direction and reverse-direction planar coils are connected in series through connecting wires. One of both ends of the series-connected planar coils is connected to the positive terminal through the wire and the other end is connected to the negative terminal through the wire. The wires are arranged along arrangement of the series-connected planar coils but in a range less than a full circle of the arrangement. A turn-back connecting wire extending from one end of the series of planar coils is arranged along the other connecting wire and connected to the negative terminal.

10 Claims, 26 Drawing Sheets

CE: Compartive Example
IW: Ideal Waveform
PE: Present Embodiment

ANGLE SENSOR

CROSS-REFERENCE TO RELATED APPLICATIONS

This application is based upon and claims the benefit of priority from each of the prior Japanese Patent Applications No. 2011-222163, filed on Oct. 6, 2011, No. 2011-222206, filed on Oct. 6, 2011, and No. 2011-222605, filed on Oct. 7, 2011, the entire contents of which are incorporated herein by reference.

TECHNICAL FIELD

The present invention relates to an angle sensor to detect a rotation angle of an output shaft of a motor or engine.

BACKGROUND ART

As one of techniques in the above field, there is heretofore known a flat type resolver disclosed in for example Patent Document 1 listed below. This flat type resolver includes a stationary-side core, a moving-side core, and a plurality of sheet coils of a multi-X type provided on a main surface of the stationary-side core. Further, connecting wires that connect the sheet coils with each other are connected so as to extend for a nearly one circle around the stationary-side core.

There is also known a sheet-coil type resolver disclosed in Patent Document 2 listed below. This resolver includes an excitation phase coil and a detection phase coil. The excitation phase coil is provided with a spiral coil (a planar coil) on a main surface of an insulation sheet layer and a spiral coil (a planar coil) on a back surface to be wound in a reverse direction when viewed from the same direction as the main surface. The detection phase coil is provided with a spiral coil (a planar coil) on a main surface of an insulation sheet layer and a spiral coil (a planar coil) on a back surface to be wound with an electric phase difference of 90° from the main-surface spiral coil (the planar coil). The excitation phase coil and the detection phase coil are placed to face each other with a gap therebetween so that they are allowed to move relatively. Herein, each spiral coil of the excitation phase coil is made in a manner that circular-arc conductors and straight conductors are joined or circular-arc conductors or straight conductors are connected into a spiral form. Each spiral coil of the detection phase coil is made in a manner that half sine-wave-shaped conductors and circular-arc or straight conductors are serially connected into a spiral form. In the spiral coils of the excitation phase coil or detection phase coil, wound in a reverse direction opposite to the spiral coils wound in a forward direction, outer circumferential ends of adjacent spiral coils are directly connected with each other while inner circumferential ends are connected with each other through connecting wires provided on different layers.

There is further known a sheet coil type resolver disclosed in Patent Document 3 listed below. This resolver is provided with two sheet coils each including a circular-disc like thin-film substrate on which a coil pattern is formed. These two sheet coils are placed to face each other with a gap therebetween. The two sheet coils include a single-phase coil pattern made of a good conductive foil wound in a spiral shape turned in a reverse direction from the center of the substrate and a double-phase coil pattern including spirally wound coil patterns arranged on a main surface and a back surface of a thin-film substrate with a phase displacement of an electrical angle of $\pi/2$ from each other. Outside the single-phase coil pattern, a transformer secondary pattern to supply excitation voltage to the single-phase coil pattern and a transformer primary pattern having the same pattern as the transformer secondary pattern are provided separately from the two sheet coils. Both the patterns are placed to face each other with a gap therebetween.

RELATED ART DOCUMENTS

Patent Documents

Patent Document 1: JP-A-2006-162577
Patent Document 2: JP-A-8 (1996)-292066
Patent Document 3: JP-A-9 (1997)-229715

SUMMARY OF INVENTION

Technical Problem

However, in the flat type resolver disclosed in Patent Document 1, the connecting wires that connect the sheet coils are formed substantially like a large loop, which may act as an antenna and be affected by external electromagnetic noise.

In the resolver disclosed in Patent Document 2, the spiral coil wound in the forward direction and the spiral coil wound in the reverse direction are asymmetric in shape. Thus, the magnetic flux density is uneven between the spiral coils and is apt to be affected by external electromagnetic noise, leading to a factor of output errors of the resolver.

In the resolver disclosed in Patent Document 3, each of the transformer secondary pattern and the transformer primary pattern is provided separately from the two sheet coils. This configuration needs their individual mounting works and wiring, resulting in poor reliability and low productivity. Since the transformer secondary pattern and the transformer primary pattern are merely placed to face each other with a gap therebetween, a magnetic flux may leak between those patterns. This causes detection errors, resulting in poor reliability.

The present invention has been made to solve the above problems and has a purpose to provide an angle sensor in which a connecting wire constituting a sensor stator is hard to be affected by external electromagnetic noise.

Another purpose of the invention is to provide an angle sensor capable of uniformizing magnetic flux densities of a planar coil wound in a forward direction and a planar coil wound in a reverse direction constituting a sensor stator, thereby enhancing detection accuracy.

Still another purpose of the invention is to provide an angle sensor providing reliability in relation to the configuration of a pair of rotary transformer coils for signal transmission, and achieving improved productivity.

Solution to Problem

To achieve the above purposes, a first aspect of the invention provides an angle sensor comprising: a sensor rotor to be mounted on a rotary shaft and having a surface on which a planar coil is formed; and a sensor stator placed with a surface facing the surface of the sensor rotor, wherein the sensor stator includes: a stator substrate; a plurality of forward-direction planar coils each wound in a spiral form in a forward direction and a plurality of reverse-direction planar coils each wound in a spiral form in a reverse direction opposite to the forward direction, the forward-direction planar coils and the reverse-direction planar coils being formed on the stator substrate and electrically connected so that the reverse-direction planar coils are in opposite phase to the forward-direction planar coils; a positive terminal and a negative terminal provided to be connectable to an external device; and connecting wires including a turn-back connecting wire and other connecting wires, wherein the forward-direction planar coils and the reverse-direction planar coils are respectively alternately arranged in a circumferential direction and connected in series through the connecting wires to form a series of planar coils having a first end and a second end, the first end being connected to the positive terminal through the other connecting wires and the second end being connected to the negative terminal through the turn-back connecting wire, and wherein the connecting wires are placed along circumferential arrangement of the series of planar coils but in a range less than a full circle of the circumferential arrangement, and the turn-back connecting wire connected to the second end of the series of planar coils is placed to extend from the second end along the other connecting wires and connected to the positive terminal or negative terminal.

To achieve the above purposes, a second aspect of the invention provides an angle sensor comprising: a sensor rotor to be mounted on a rotary shaft and having a surface on which a planar coil is formed; and a sensor stator having a surface on which a planar coil is formed, the sensor stator being placed with the surface facing the surface of the sensor rotor, wherein the sensor stator includes: a stator substrate; a plurality of forward-direction planar coils each wound in a spiral form in a forward direction and a plurality of reverse-direction planar coils each wound in a spiral form in a reverse direction opposite to the forward direction, the forward-direction planar coils and the reverse-direction planar coils being arranged in a circumferential direction on the stator substrate and electrically connected so that the reverse-direction planar coils are in opposite phase to the forward-direction planar coils; and connecting wires, wherein the forward-direction planar coils and the reverse-direction planar coils are symmetric about a symmetry axis extending in a radial direction by passing a center in a circumferential direction, each of the planar coils including a first end and a second end, wherein the forward-direction planar coils and the reverse-direction planar coils are connected in series through the connecting wires, and the first end and the second end of each of the planar coils connected in series are located on the symmetry axis.

To achieve the above purposes, a third aspect of the invention provides an angle sensor comprising: a sensor rotor including an annular rotor substrate having a surface on which a planar coil is formed, a rotor-side annular metal member provided on an inner circumferential side of the rotor substrate, the sensor rotor being mounted on a rotary shaft through the rotor-side annular metal member; and a sensor stator including a stator substrate having a surface on which a planar coil is formed, the stator substrate being placed so that the surface faces the surface of the sensor rotor, and a stator-side annular metal member provided on an inner circumferential side of the stator substrate, wherein each of the rotor-side annular metal member and the stator-side annular metal member is made of a magnetic material and formed with an annular facing portion, the annular facing portions of the rotor-side annular metal member and the stator-side annular metal member facing each other with a gap between the annular facing portions, each including a rotary transformer coil for signal transmission.

Advantageous Effects of Invention

According to the first aspect of the invention, the connecting wires constituting the sensor stator are hard to be affected by external electromagnetic noise. Thus, the external electromagnetic noise to the planar coil can be reduced. Hence, the angle sensor can achieve enhanced detection accuracy and performance.

According to the second aspect of the invention, the electromagnetic flux density of the forward-direction planar coil and that of the reverse-direction planar coil constituting the sensor stator can be uniformized. Thus, the angle sensor can achieve enhanced detection accuracy and performance.

According to the third aspect of the invention, it is possible to ensure the reliability in relation to the configuration of the pair of rotary transformer coils for signal transmission, and achieving improved productivity.

DESCRIPTION OF EMBODIMENTS

<First Embodiment>

A detailed description of a first preferred embodiment of an angle sensor of the present invention will now be given referring to the accompanying drawings.

Figure 1:
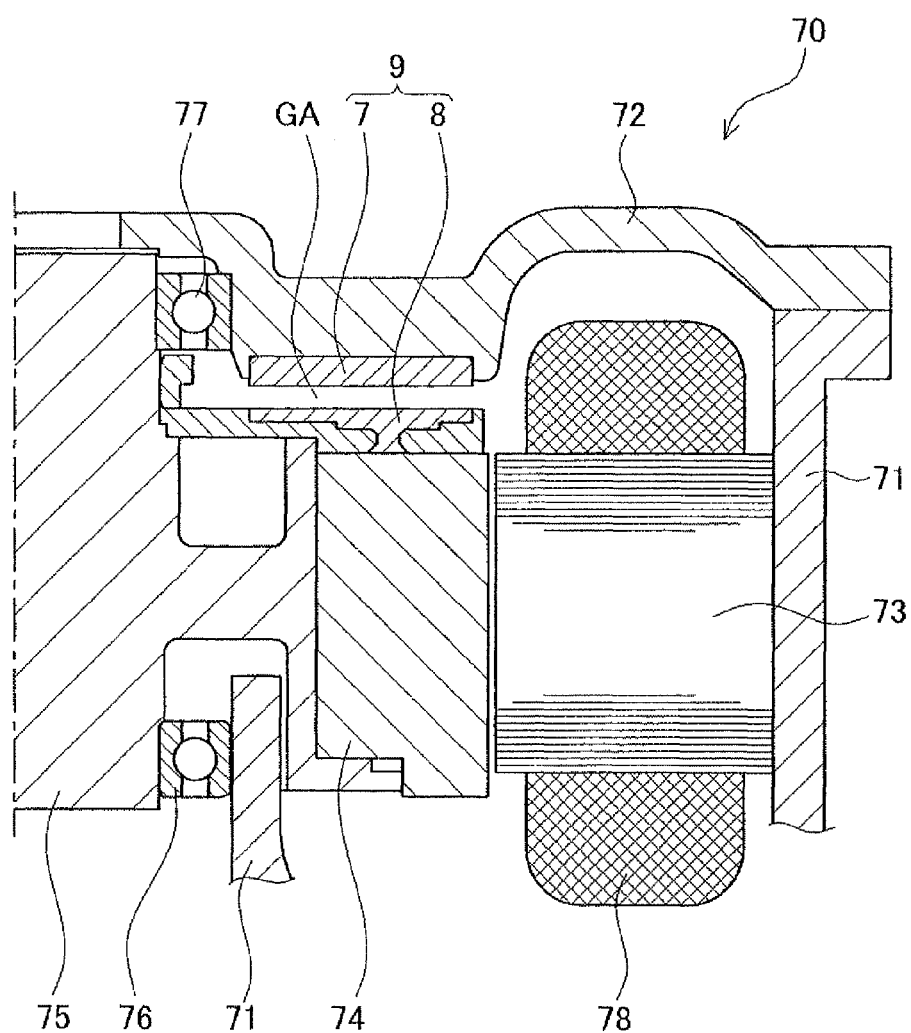
FIG. 1 is a cross sectional view showing a part of a motor in which an angle sensor is mounted in a first embodiment.

FIG. 1 is a cross sectional view showing a part of a motor 70 in which an angle sensor 9 of this embodiment is mounted. The motor 70 includes a motor case 71, a case cover 72 covering an opening of the motor case 71, a motor stator 73 fixed to the motor case 71, a motor rotor 74 provided inside the motor stator 73, a motor shaft 75 serving as a rotary shaft provided in the center of and integral with the motor rotor 74, and a pair of bearings 76 and 77 to rotatably support the motor shaft 75 between the motor case 71 and the motor cover 72.

The motor case 71 and the case cover 72 are made of aluminum alloy and others by casting. The motor stator 73 includes a coil 78 and is fixed to the inner periphery of the motor case 71. The motor stator 73 is excited when the coil 78 is energized, generating a magnetic force.

The motor rotor 74 includes a permanent magnet (not shown). The motor rotor 74 is spaced with a predetermined gap from the motor stator 73. When the motor stator 73 is excited by energization, the motor rotor 74 is rotated together with the motor shaft 75 to generate a driving force.

As shown in FIG. 1, the angle sensor 9 is provided in the case cover 72 and the motor rotor 74. A sensor stator 7 constituting the angle sensor 9 is fixed to the case cover 72. A sensor rotor 8 constituting the angle sensor 9 is fixed to the motor rotor 74. While the motor case 71 and the case cover 72 are assembled, the sensor rotor 8 and the sensor stator 7 are spaced with their surfaces facing each other with a predetermined gap GA. As this gap GA is narrower, the detection accuracy of the angle sensor 9 can be increased. It is further preferable to determine the size of the gap GA in consideration of a dimensional tolerance, a dimensional change depending on temperature, and others.

Figure 2:
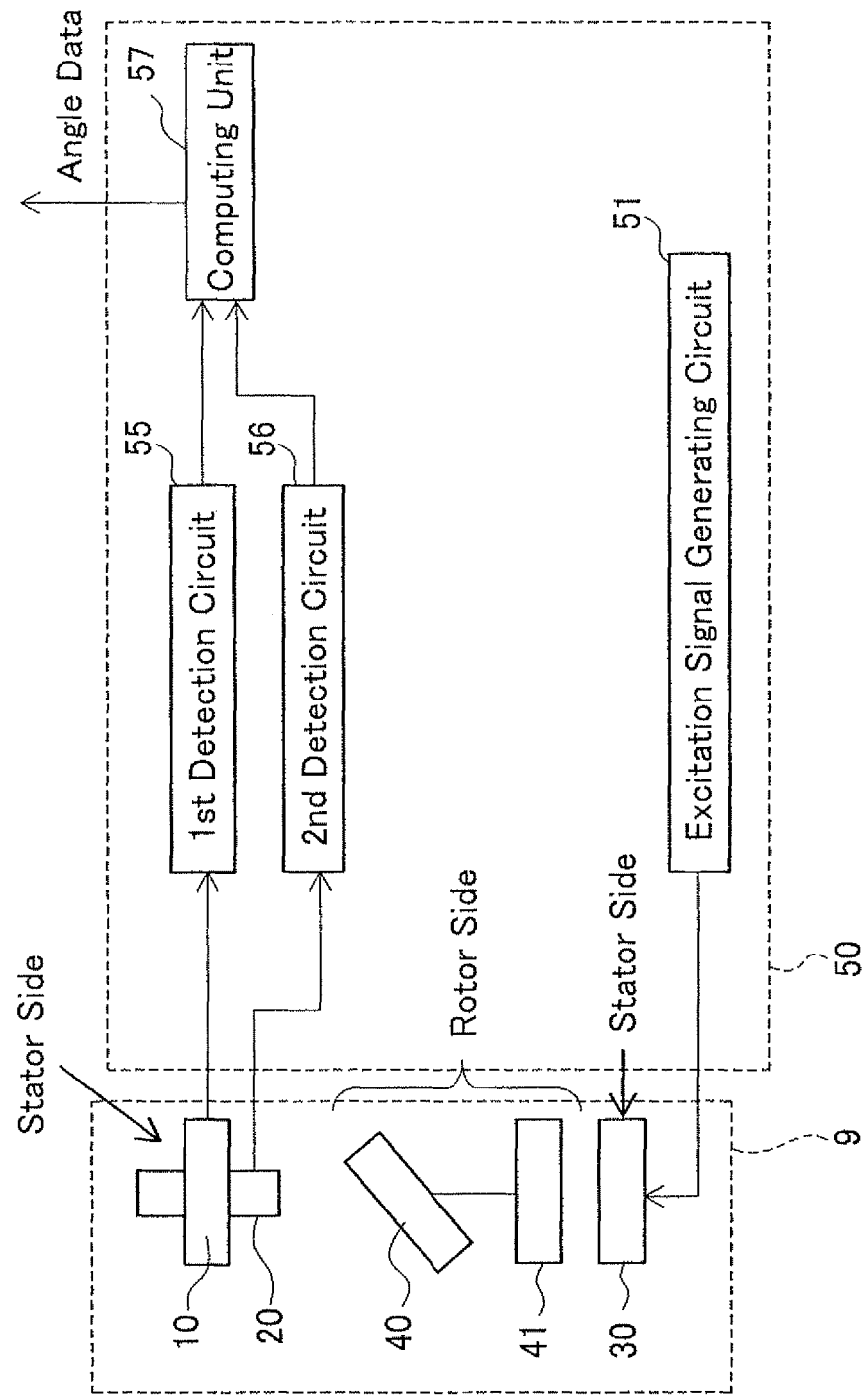
FIG. 2 is a block diagram showing an electric configuration of the angle sensor in the first embodiment.

FIG. 2 is a block diagram showing an electric configuration of the angle sensor 9. The angle sensor 9 includes a SIN signal detection coil 10, a COS signal detection coil 20, and a stator-side rotary transformer 30, each being provided in the sensor stator 7, and an excitation coil 40 and a rotor-side rotary transformer 41 each being provided in the sensor rotor 8. The SIN signal detection coil 10 and the COS signal detection coil 20 are displaced in phase by a predetermined angle. A signal processing device 50 includes an excitation signal generating circuit 51, a first detection circuit 55, a second detection circuit 56, and a computing unit 57, each being connected to the angle sensor 9. The excitation signal generating circuit 51 is configured to output an excitation signal (a sine wave signal) of a high frequency (480 kHz) to the stator-side rotary transformer 30. The first detection circuit 55 is configured to receive a SIN signal output from the SIN signal detection coil 10. The second detection circuit 56 is configured to receive a COS signal output from the COS signal detection coil 20. The computing unit 57 is configured to receive a SIN signal and a COS signal output respectively from the first detection circuit 55 and the second detection circuit 56.

In the aforementioned signal processing device 50, when an excitation signal is generated in the excitation signal generating circuit 51, the excitation signal is input into the rotor-side excitation coil 40 via the stator-side rotary transformer 30 and the rotor-side rotary transformer 41. A magnetic flux generated by the electric current of the excitation signal generates an electromotive force (a SIN signal and a COS signal) in the stator-side SIN signal detection coil 10 and the COS signal detection coil 20. Amplitude variation of the electromotive force (the SIN signal) generated in the SIN signal detection coil 10 and amplitude variation of the electromotive force (the COS signal) generated in the COS signal detection coil 20 are analyzed to calculate a rotational position of the sensor rotor 8. Specifically, the first detection circuit 55 removes high-frequency components of the excitation signal from the SIN signal generated in the SIN signal detection coil 10. On the other hand, the second detection circuit 56 removes high-frequency components of the excitation signal from the COS signal generated in the COS signal detection coil 20. The computing unit 57 then calculates a current angular position of the sensor rotor 8 based on a ratio in amplitude between the output signal of the first detection circuit 55 and the output signal of the second detection circuit 56, and outputs a calculation result thereof as angle data.

Figure 3:
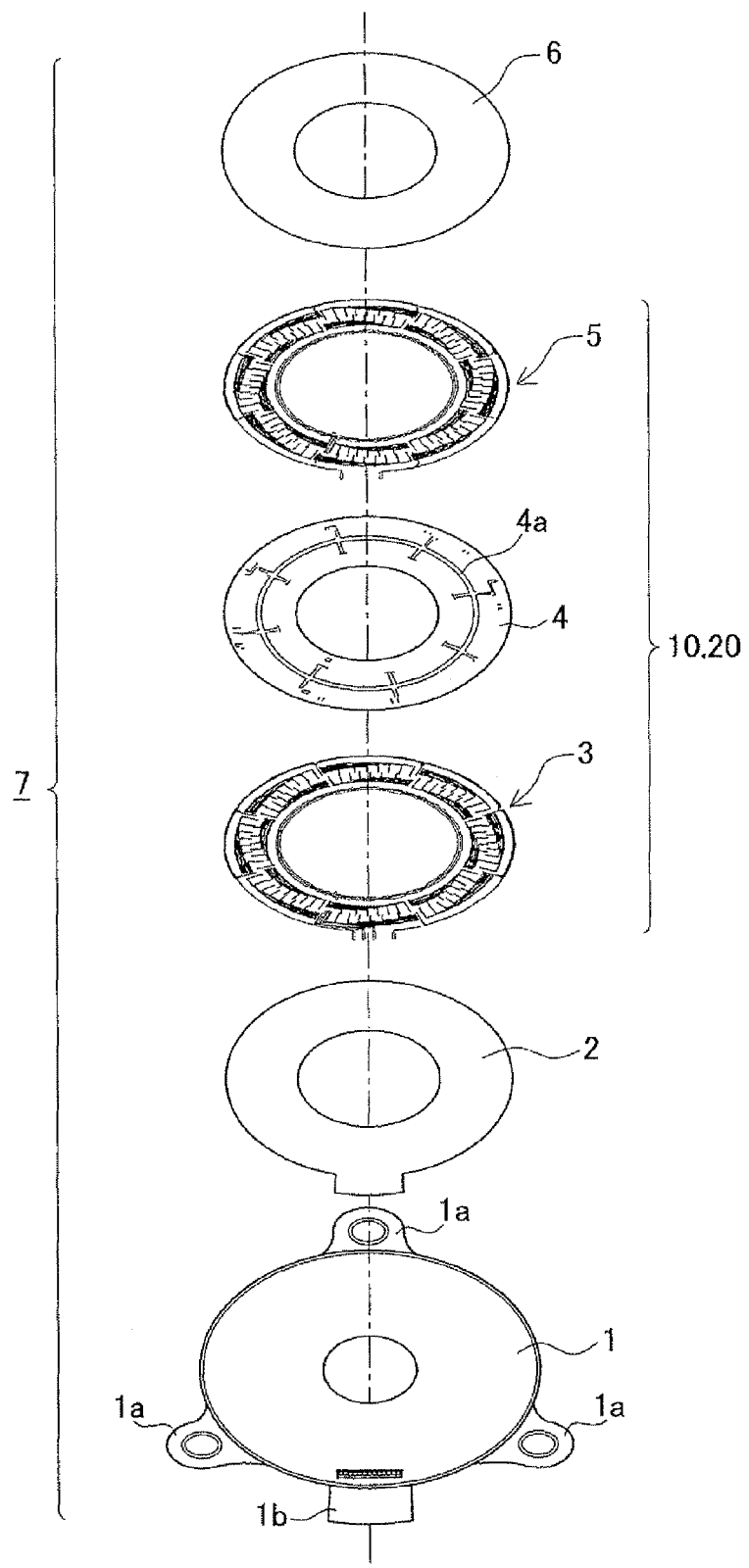
FIG. 3 is a perspective exploded view of a sensor stator in the first embodiment.

The details of the structure of the sensor stator 7 will be explained below. FIG. 3 is an exploded perspective view of the sensor stator 7. The sensor stator 7 includes, from bottom, as shown in FIG. 3, a stator substrate 1, a first insulation layer 2, a first coil layer 3, a second insulation layer 4, a second coil layer 5, and an overcoat 6. The stator substrate 1 is made of PPS resin in a substantially annular disc shape having high flatness. The first insulation layer 2 is formed on the stator substrate 1 and has a substantially annular thin-film shape. The stator substrate 1 includes three mounting parts 1a and one connector part 1b which are arranged along the outer periphery of the substrate 1. The first coil layer 3 is formed on a main surface (an upper surface in FIG. 3) of the first insulation layer 2. The second insulation layer 4 has a substantially annular thin-film shape and is formed on the first coil layer 3. This second insulation layer 4 is formed with a substantially annular through hole 4a. The second coil layer 5 is formed on the second insulation layer 4. The overcoat 6 is formed on the second coil layer 5 to protect this layer 5.

In FIG. 3, the first coil layer 3, second insulation layer 4, and second coil layer 5 constitute the SIN signal detection coil 10 and the COS signal detection coil 20 described above. More specifically, the first coil layer 3 and the second coil layer 5, formed to overlap one above the other while the second insulation layer 4 is interposed therebetween, are connected with each other to constitute the SIN signal detection coil 10 and the COS signal detection coil 20 respectively serving as a multi-X type planar coil. The sensor stator 7 is placed with its surface facing the surface of the sensor rotor 8. On the surface of the sensor stator 7, the SIN signal detection coil 10 and the COS signal detection coil 20 are formed.

Figure 4:
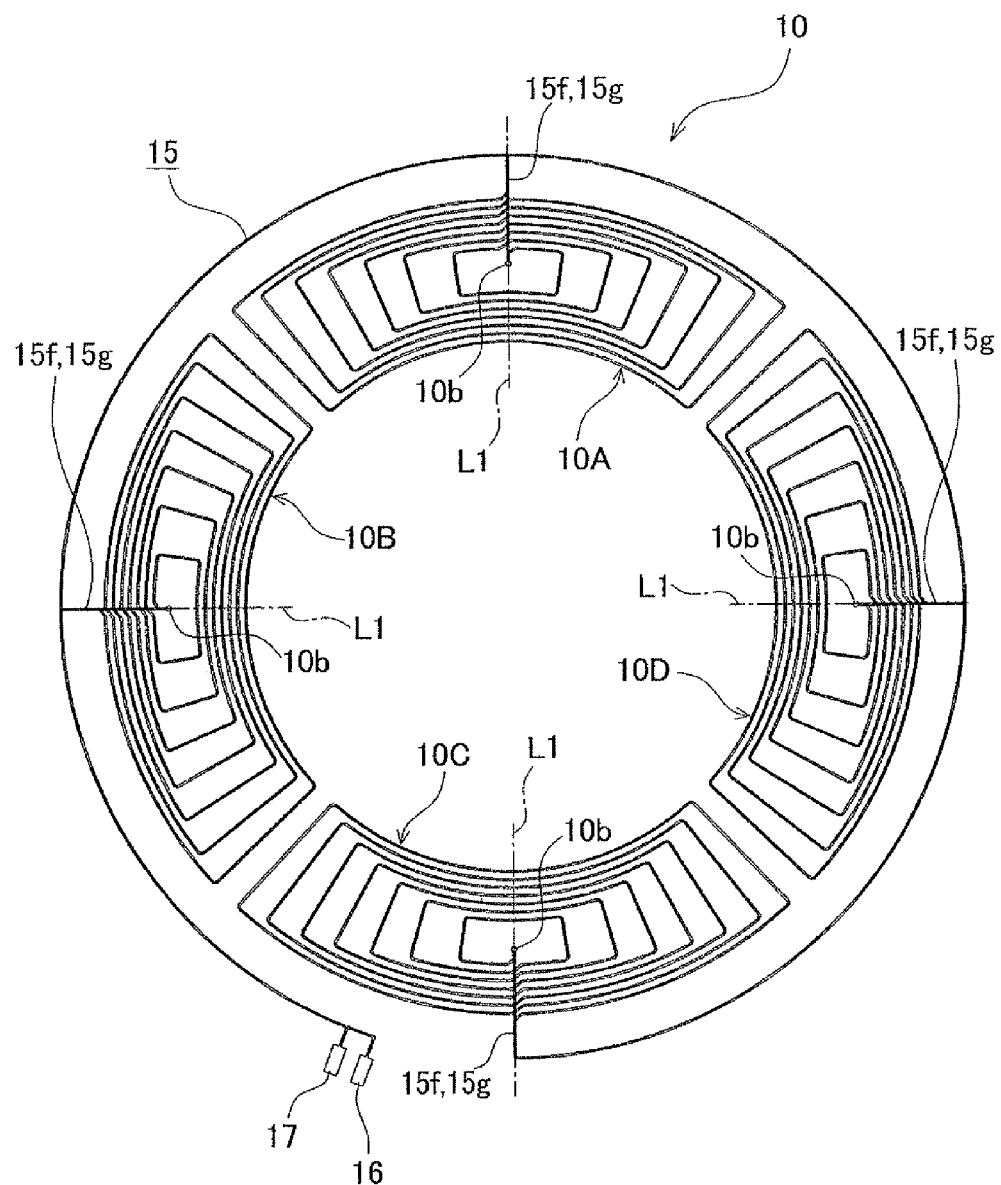
FIG. 4 is a plan view showing a pattern image of a SIN signal detection coil in the first embodiment.
Figure 5:
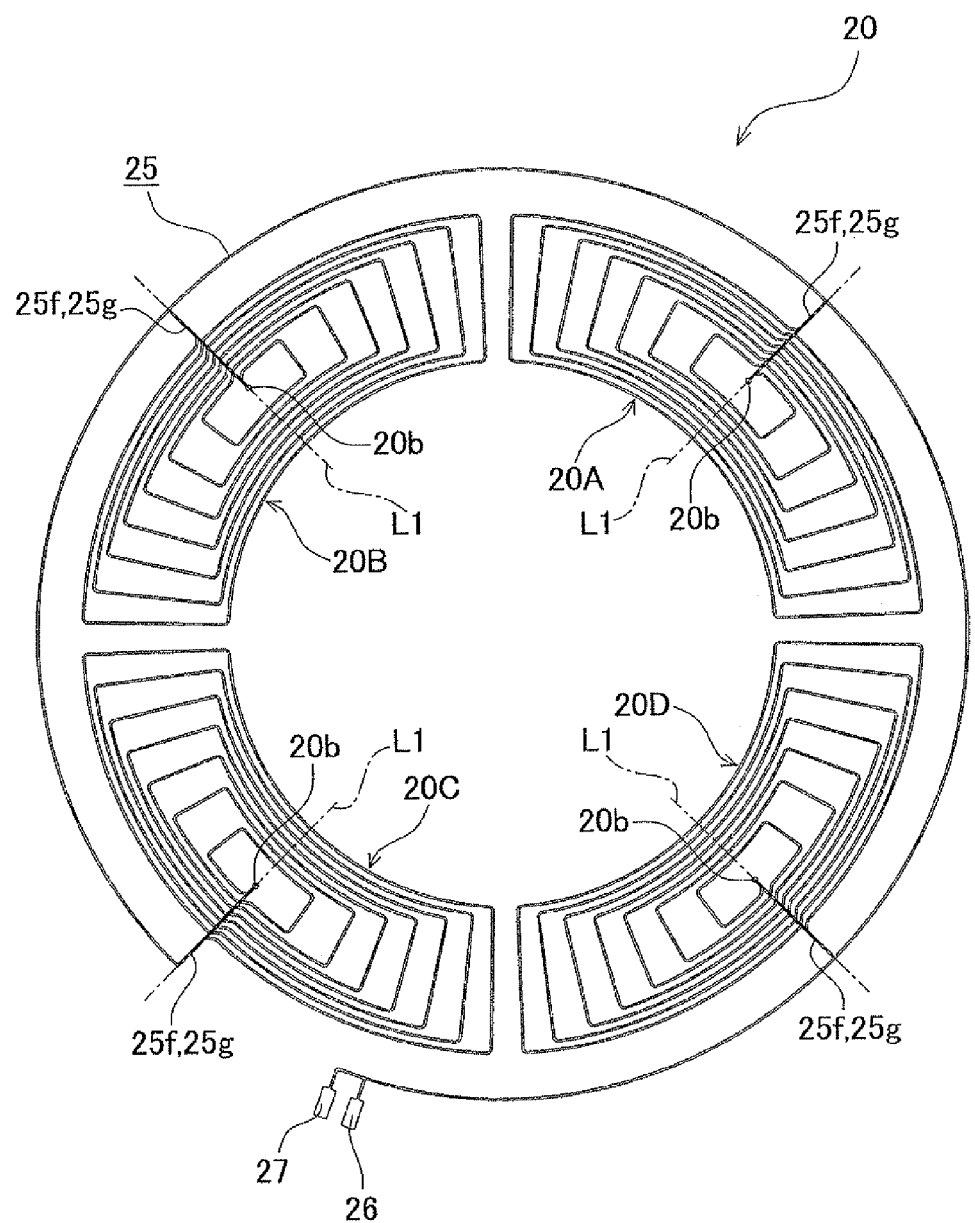
FIG. 5 is a plan view showing a pattern image of a COS signal detection coil in the first embodiment.

FIG. 4 is a plan view showing a pattern image of the SIN signal detection coil 10 serving as a planar coil of the invention. FIG. 5 is a plan view showing a pattern image of the COS signal detection coil 20 serving as the planar coil of the invention. As shown in FIG. 4, the entire SIN signal detection coil 10 has a substantially annular shape including four circular-arc coils 10A, 10B, 10C, and 10D arranged in phase positions at an electrical angle of 180° (a mechanical angle of 90°). The circular-arc coils 10A-10D are arranged in a circumferential direction on the stator substrate 1. These coils 10A-10D circumferentially placed are connected in series via a connecting wire 15 arranged adjacently outside the coils 10A-10D in a radial direction. Both ends of the connecting wire 15 are respectively connected to a positive terminal 16 and a negative terminal 17 placed adjacent to each other. Both the terminals 16 and 17 are provided to be connectable respectively to an external device. Each of the circular-arc coils 10A-10D consists of wires divided into two in the circumferential direction and further divided into two in the radial direction, as will be mentioned later.

Similarly, as shown in FIG. 5, the entire COS signal detection coil 20 has a substantially annular shape including four circular-arc coils 20A, 20B, 20C, and 20D arranged in phase positions of 180° in electrical angle (90° in mechanical angle). These coils 20A-20D are arranged in a circumferential direction on the stator substrate 1. These coils 20A-20D circumferentially placed are connected in series via a connecting wire 25 arranged adjacently outside the coils 20A-20D in a radial direction. Both ends of the connecting wire 25 are connected to a positive terminal 26 and a negative terminal 27 placed adjacent to each other. Both the terminals 26 and 27 are provided to be connectable respectively to an external device. Each of the circular-arc coils 20A-20D consists of wires divided into two in the circumferential direction and further divided into two in the radial direction, as will be mentioned later. The SIN signal detection coil 10 and the COS signal detection coil 20 are located coaxially so that phases of the coils 10 and 20 are displaced from each other by an electrical angle of 90° (a mechanical angle of 45°).

Figure 6:
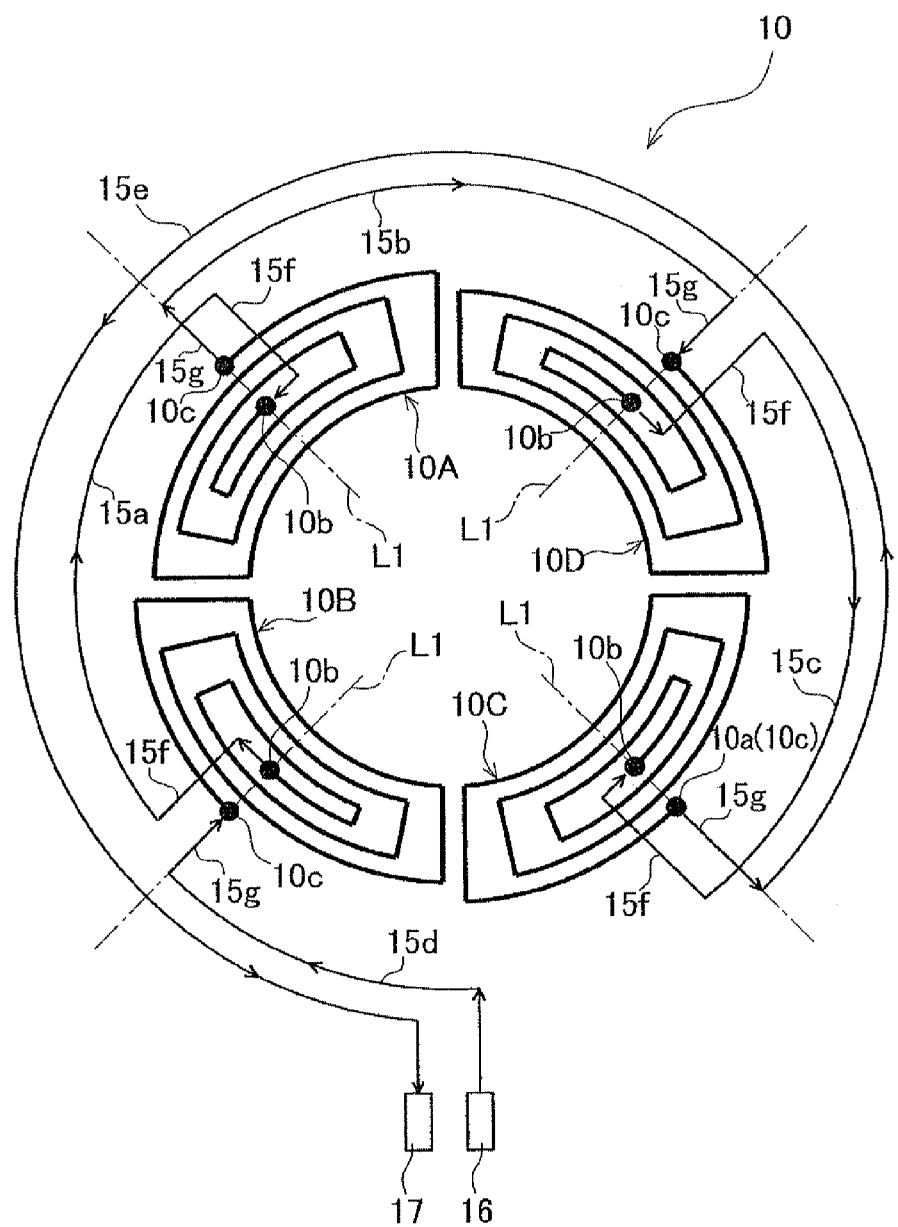
FIG. 6 is a plan view showing a schematic configuration of the pattern image of the SIN signal detection coil in the first embodiment.
Figure 7:
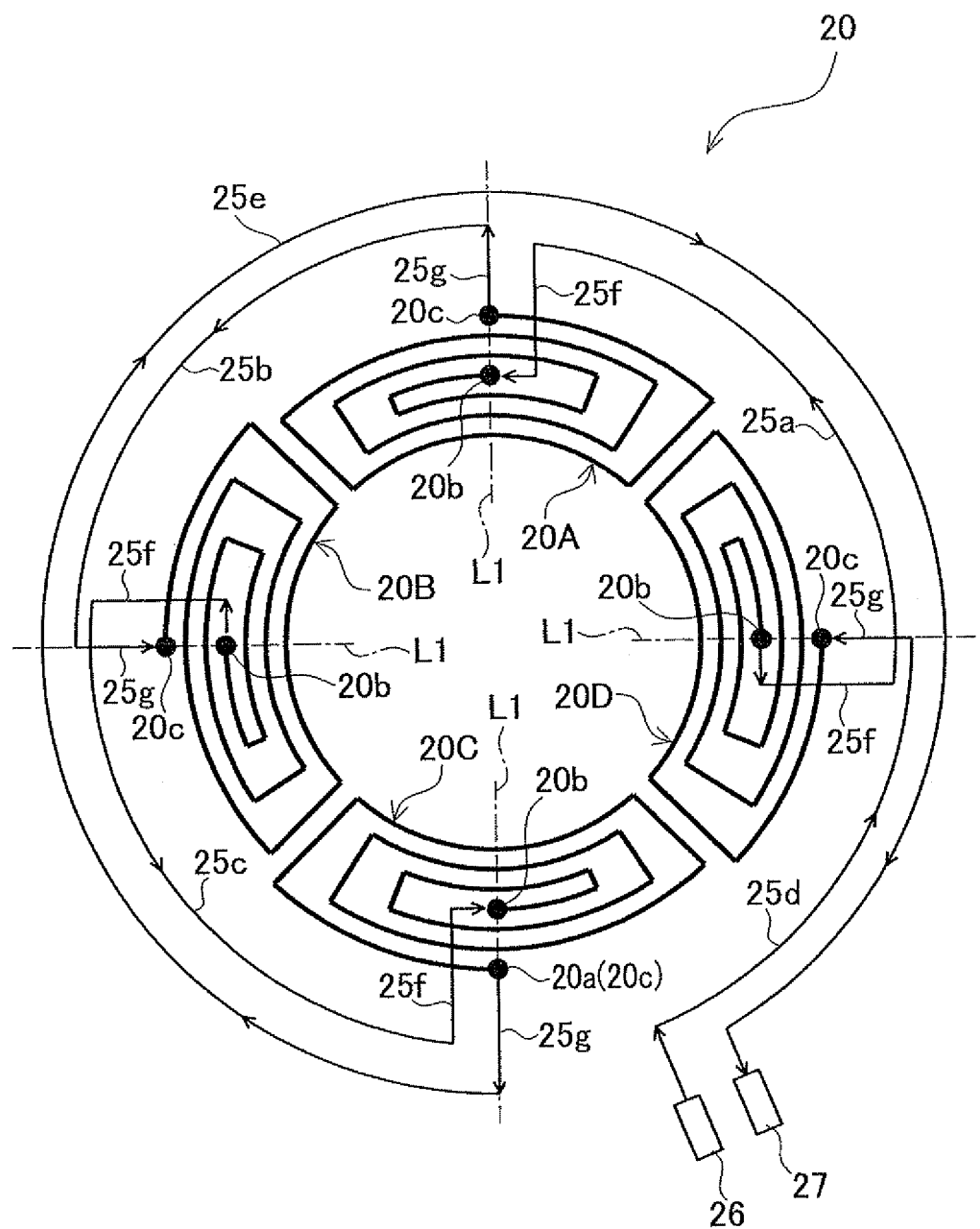
FIG. 7 is a plan view showing a schematic configuration of the pattern image of the COS signal detection coil in the first embodiment.

FIG. 6 is a plan view showing a schematic configuration of the pattern image of the SIN signal detection coil 10. FIG. 7 is a plan view showing a schematic configuration of the pattern image of the COS signal detection coil 20. As shown in FIG. 6, the SIN signal detection coil 10 includes the forward-direction circular-arc coils 10B and 10D each wound in a spiral form in a forward direction as a forward-direction planar coil and the reverse-direction circular-arc coils 10A and 10C each wound in a spiral form in a reverse direction opposite to the forward direction as a reverse-direction planar coil electrically connected to the forward-direction planar coil so that the coils 10A and 10C are in opposite phase to the coils 10B and 10D, the coils 10A-10D being arranged alternately in the circumferential direction on the stator substrate 1, and also the positive terminal 16 and the negative terminal 17 placed adjacent to each other and provided to be connectable to an external device. The forward-direction circular-arc coils 10B and 10D and the reverse-direction circular-arc coils 10A and 10C are connected in series through intermediate connecting wires 15a, 15b, and 15c. One end (a first end) of both ends of a series of circular-arc coils 10A-10D connected in series is connected to the positive terminal 16 via a first-end connecting wire 15d, while the other end (a second end) of the series-connected coils 10A-10D is connected to the negative terminal 17 via a second-end connecting wire 15e. The connecting wires 15a-15e constituting the connecting wire 15 are placed along the circumferential arrangement of the series-connected coils 10A-10D, but in a range less than a full circle of the circumferential arrangement of the series-connected coils 10A-10D. The second-end connecting wire 15e connected to one end 10a (the second end) of the series-connected coils 10A-10D is placed as a turn-back connecting wire extending from the end 10a which is a turn-back point along the other connecting wires, i.e., the intermediate connecting wires 15a-15c and the first-end connecting wire 15d, and finally connected with the negative terminal 17. In the present embodiment, as shown in FIG. 4, the second-end connecting wire 15e used as the turn-back connecting wire is arranged to overlap the other connecting wires 15a-15d while the second insulation layer 4 is interposed between the wire 15e and the wires 15a-15d (they are illustrated horizontally side by side in FIG. 6 for convenience). In FIG. 4, the connecting wires 15a-15e shown in FIG. 6 are referred to collectively as the connecting wire 15.

As shown in FIG. 7, the COS signal detection coil 20 includes the forward-direction circular-arc coils 20B and 20D each wound in a spiral form in a forward direction as a forward-direction planar coil and the reverse-direction circular-arc coils 20A and 20C each wound in a spiral form in a reverse direction opposite to the forward direction as a reverse-direction planar coil electrically connected to the forward-direction planar coil so that the coils 20A and 20C are in opposite phase to the coils 20B and 20D, the coils 20A-20D being arranged alternately in the circumferential direction on the stator substrate 1, and also the positive terminal 26 and the negative terminal 27 placed adjacent to each other and provided to be connectable to external devices. The forward-direction circular-arc coils 20B and 20D and the reverse-direction circular-arc coils 20A and 20C are connected in series through intermediate connecting wires 25a, 25b, and 25c. One end (a first end) of both ends of a series of the circular-arc coils 20A-20D connected in series is connected to the positive terminal 26 via a first-end connecting wire 25d, while the other end (a second end) of the series-connected coils 20A-20D is connected to the negative terminal 27 via a second-end connecting wire 25e. The connecting wires 25a-25e constituting the connecting wire 25 are placed along the circumferential arrangement of the series-connected coils 20A-20D, but in a range less than a full circle of the circumferential arrangement of the series-connected coils 20A-20D. The second-end connecting wire 25e connected to one end 20a (the second end) of the series-connected coils 20A-20D is placed as a turn-back connecting wire extending from the end 20a which is a turn-back point along the other connecting wires, i.e., the intermediate connecting wires 25a-25c and the first-end connecting wire 25d, and finally connected with the negative terminal 27. In the present embodiment, as shown in FIG. 5, the second-end connecting wire 25e used as the turn-back connecting wire is arranged to overlap the other connecting wires 25a-25d while the second insulation layer 4 is interposed between the wire 25e and the wires 25a-25d (they are illustrated horizontally side by side in FIG. 7 for convenience). In FIG. 5, the connecting wires 25a-25e shown in FIG. 7 are referred to collectively as the connecting wire 25.

Figure 8:
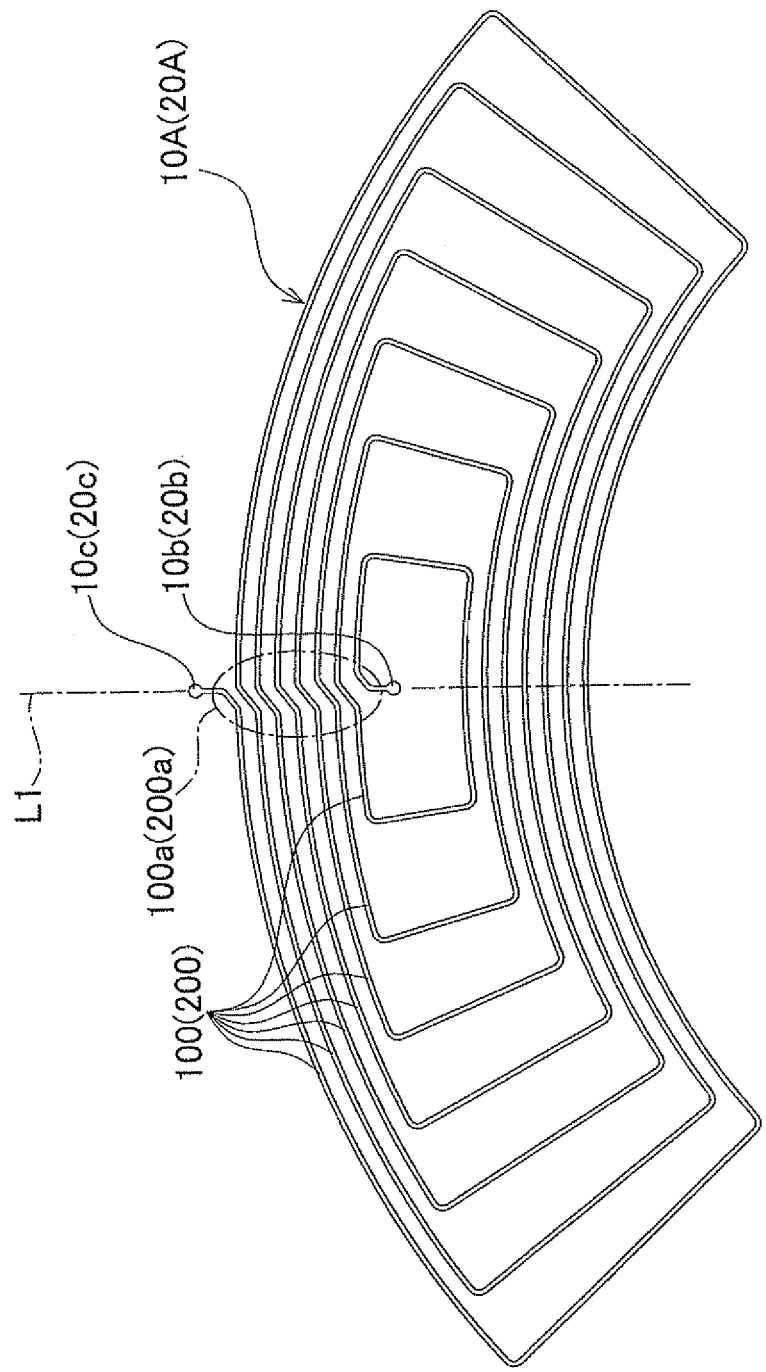
FIG. 8 is an enlarged plan view of, as a typical example, one of circular-arc coils in the first embodiment.

FIG. 8 is an enlarged plan view showing the circular-arc coil 10A (20A) as a typical example of the circular-arc coils 10A-10D and 20A-20D. As shown in FIGS. 4, 6, and 8, one end (a first end) 10b and the other end (a second end) 10c of each of the coils 10A-10D constituting the SIN signal detection coil 10 are located in the center in the circumferential direction of each coil 10A-10D. Specifically, each coil 10A-10D has a right and left symmetric shape about a symmetry axis L1 extending in the radial direction. The one end 10b and the other end 10c of each coil 10A-10D are located on the symmetry axis L1 of the coil 10A-10D. The coils 10A-10D connected to the connecting wires 15a-15e are each configured so that electric current flows in respective center positions in the circumferential direction and flows out from those center positions.

As shown in FIG. 8, in each of the circular-arc coils 10A-10D, the one end 10b is located inside the coil 10A-10D while the other end 10c is located outside the coil 10A-10D. Further, a displaced portion 100a is provided in which the arrangement of a coil wire group 100 constituting each coil 10A-10D is displaced in the radial direction between the one end 10b and the other end 10c so that the coil wire group 100 is configured to be symmetric about the symmetry axis L1.

As shown in FIG. 6, in the SIN signal detection coil 10, the connecting wires 15a-15e are arranged on the outer circumferential side of the circular-arc coils 10A-10D connected in series. For each of the coils 10A-10D, there are provided a first bridging wire 15f radially extending from the one end 10b to one of the connecting wires 15a-15e and a second bridging wire 15g radially extending from the other end 10c to one of the connecting wires 15a-15e. The first bridging wire 15f and the second bridging wire 15g are arranged, as shown in FIG. 4, to overlap one above the other while interposing the second insulation layer 4 (see FIG. 3) therebetween.

Similarly, as shown in FIGS. 5, 7, and 8, one end (a first end) 20b and the other end (a second end) 20c of each of the coils 20A-20D constituting the COS signal detection coil 20 are located in the center in the circumferential direction of each coil 20A-20D. Specifically, each coil 20A-20D has a right and left symmetric shape about the axis of symmetry L1 extending in the radial direction. The end 20b and the other end 20c of each coil 20A-20D are located on the symmetry axis L1 of each coil 20A-20D. The coils 20A-20D connected to the connecting wires 25a-25e are each configured so that electric current flows in respective center positions in the circumferential direction and flows out from those center positions.

As shown in FIG. 8, in each of the circular-arc coils 20A-20D, the one end 20b is located inside the coil 20A-20D while the other end 20c is located outside the coil 20A-20D. Further, a displaced portion 200a is provided in which the arrangement of a coil wire group 200 constituting each coil 20A-20D is displaced in the radial direction between the one end 20b and the other end 20c so that the coil wire group 200 is configured to be symmetric about the symmetry axis L1.

As shown in FIG. 7, in the COS signal detection coil 20, the connecting wires 25a-25e are arranged on the outer circumferential side of the circular-arc coils 20A-20D connected in series. For each of the coils 20A-20D, there are provided a first bridging wire 25f radially extending from the one end 20b to one of the connecting wires 25a-25e and a second bridging wire 25g radially extending from the other end 20c to one of the connecting wires 25a-25e. The first bridging wire 25f and the second bridging wires 25g are arranged, as shown in FIG. 5, to overlap one above the other while interposing the second insulation layer 4 (see FIG. 3) therebetween.

Figure 9:
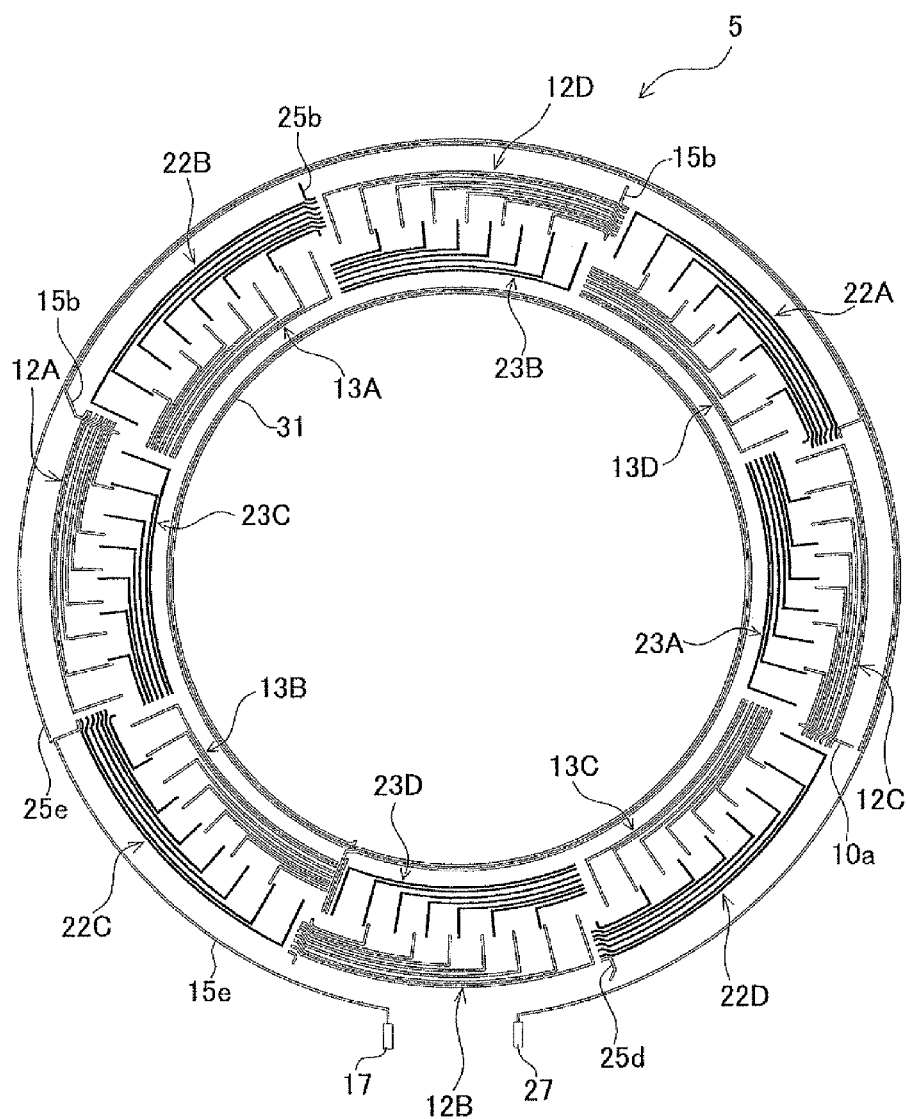
FIG. 9 is a plan view showing a second coil layer in the first embodiment.
Figure 10:
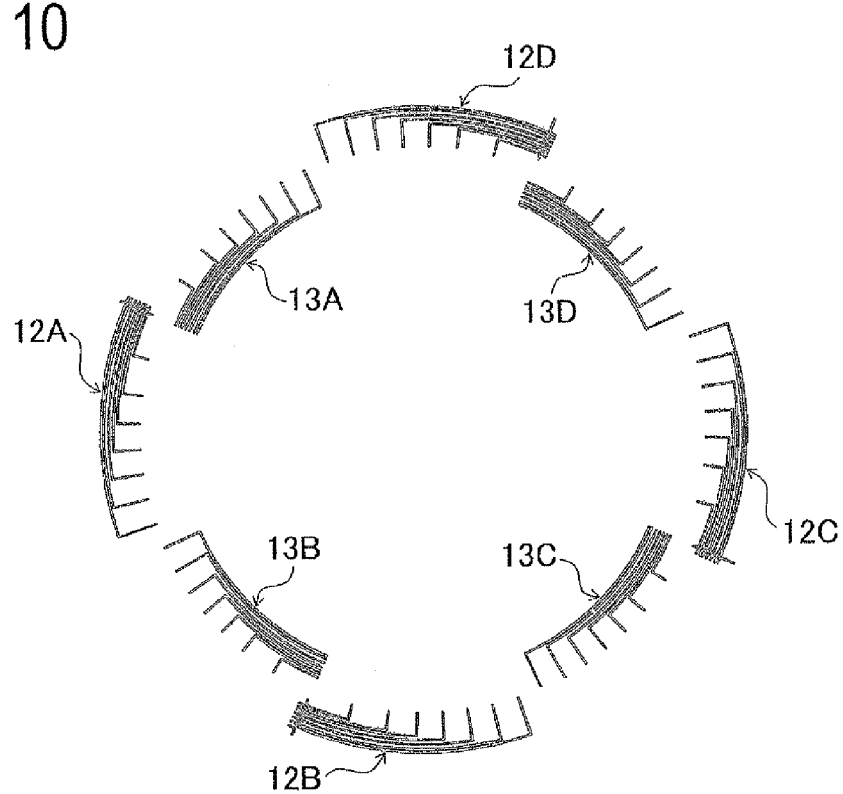
FIG. 10 is a plan view selectively illustrating only a SIN second coil and a SIN third coil shown in FIG. 9 in the first embodiment.

FIG. 9 is a plan view of the second coil layer 5. A coil pattern of the second coil layer 5 is formed in a manner that the pattern is drawn by printing using a conductive ink on the surface of the second insulation layer 4 and then burnt. The second coil layer 5 having a substantially annular shape includes four SIN second coils 12A, 12B, 12C, and 12D, constituting the SIN signal detection coil 10, placed on an outer circumferential side and in different positions from each other by an electrical angle of 180° (a mechanical angle of 90°) as shown in FIG. 9. The second coil layer 5 further includes four. SIN third coils 13A, 13B, 13C, and 13D placed on inner circumferential side and in different positions from each other by an electrical angle of 180° (a mechanical angle of 90°) as shown in FIG. 9. FIG. 10 is a plan view selectively illustrating only the SIN second coils 12A-12D and the SIN third coils 13A-13D shown in FIG. 9. Those SIN third coils 13A-the 13D are placed in positions clockwise displaced by an electrical angle of 90° (a mechanical angle of 45°) from the SIN second coils 12A-12D respectively.

Figure 11:
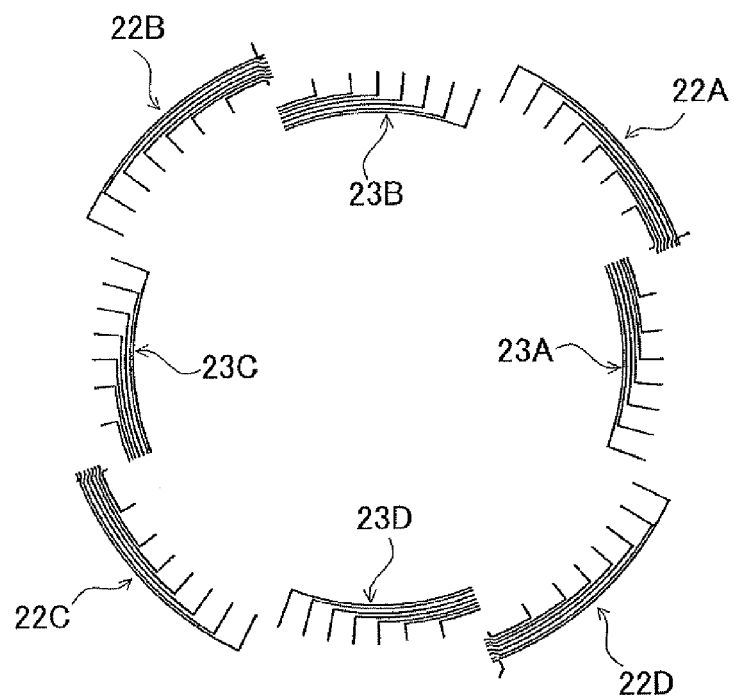
FIG. 11 is a plan view selectively illustrating only a COS second coil and a COS third coil shown in FIG. 9 in the first embodiment.

As shown in FIG. 9, on the inner circumferential side of the SIN second coils 12A-12D, COS third coils 23C, 23D, 23A, and 23B constituting the COS signal detection coil 20 are arranged. On the outer circumferential side of the SIN third coils 13A-13D, COS second coils 22B, 22C, 22D, and 22A constituting the COS signal detection coil 20 are arranged. FIG. 11 is a plan view selectively illustrating only the COS second coils 22A-22D and the COS third coils 23A-23D shown in FIG. 9. Those. COS third coils 23A-23D are placed in positions clockwise displaced by an electrical angle of 90° (a mechanical angle of 45°) from the COS second coils 22A-22D respectively.

Figure 12:
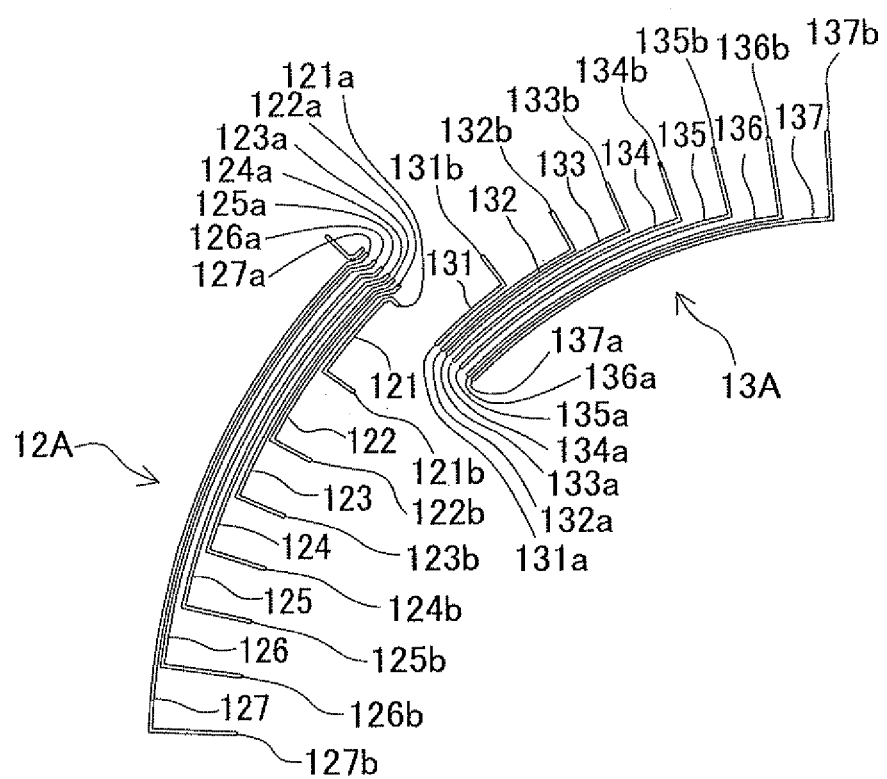
FIG. 12 is an enlarged plan view selectively illustrating only parts of the SIN third coil and the SIN second coil shown in FIGS. 9 and 10 to show a relationship between the SIN third coil and the SIN second coil in the first embodiment.

FIG. 12 is an enlarged plan view selectively illustrating only the SIN third coil 13A and the SIN second coil 12A shown in FIGS. 9 and 10 to show a relationship between the SIN third coils 13A-13D and the SIN second coils 12A-12D. As shown in FIG. 12, the SIN second coil 12A includes seven coil wires 121, 122, 123, 124, 125, 126, and 127 constituting a quarter of a nearly rectangular shape. Those coil wires 121-127 are formed and arranged so that they are gradually larger from the inner circumferential side to the outer circumferential side. The coil wires 121-127 respectively include first ends 121a, 122a, 123a, 124a, 125a, 126a, and 127a and second ends 121b, 122b, 123b, 124b, 125b, 126b, and 127b. Similarly, the SIN third coil 13A includes seven coil wires 131, 132, 133, 134, 135, 136, and 137 constituting a quarter of the nearly rectangular shape are formed and arranged so that they are gradually larger from the outer circumferential side to the inner circumferential side. The coil wires 131-137 respectively include first ends 131a, 132a, 133a, 134a, 135a, 136a, and 137a and second ends 131b, 132b, 133b, 134b, 135b, 136b, and 137b.

Figure 13:
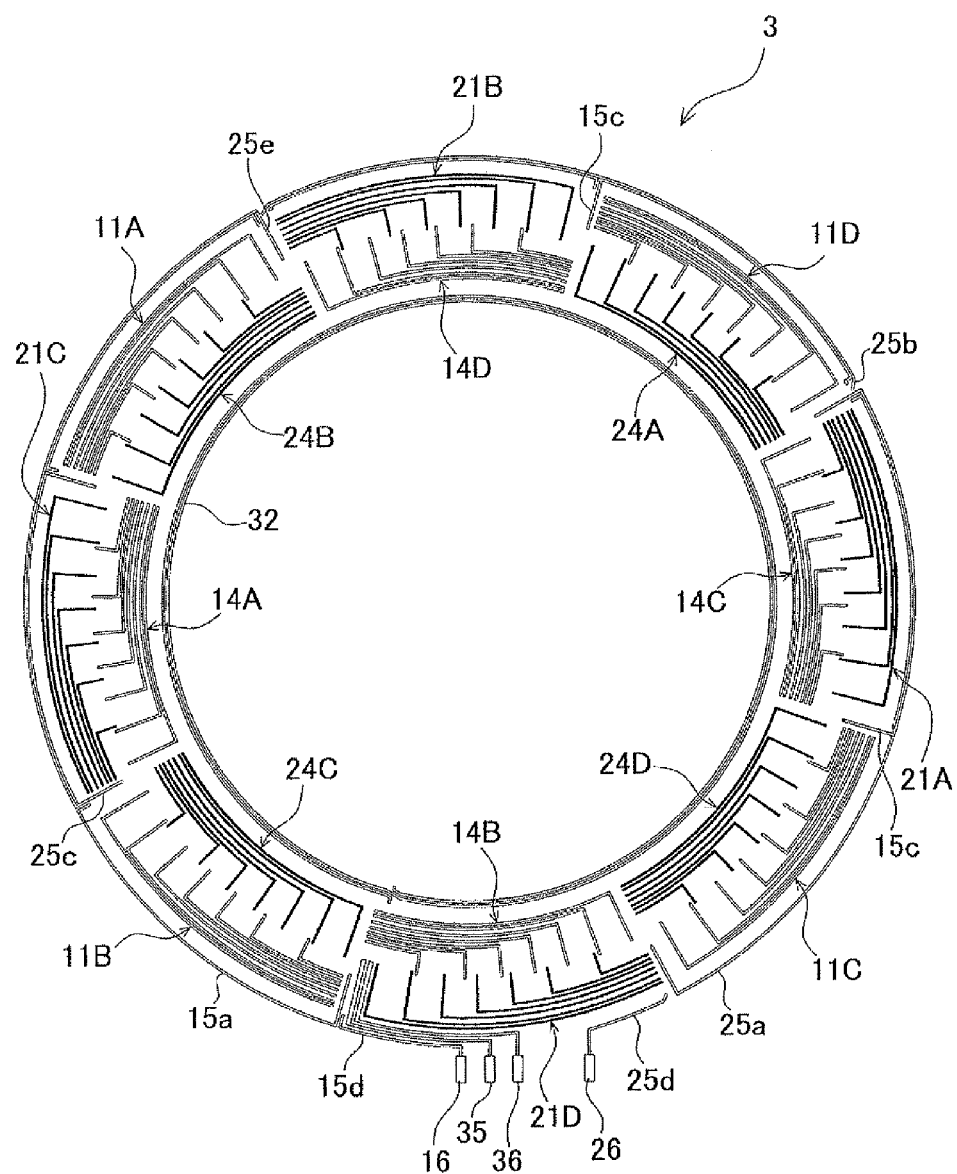
FIG. 13 is a plan view showing a first coil layer in the first embodiment.
Figure 14:
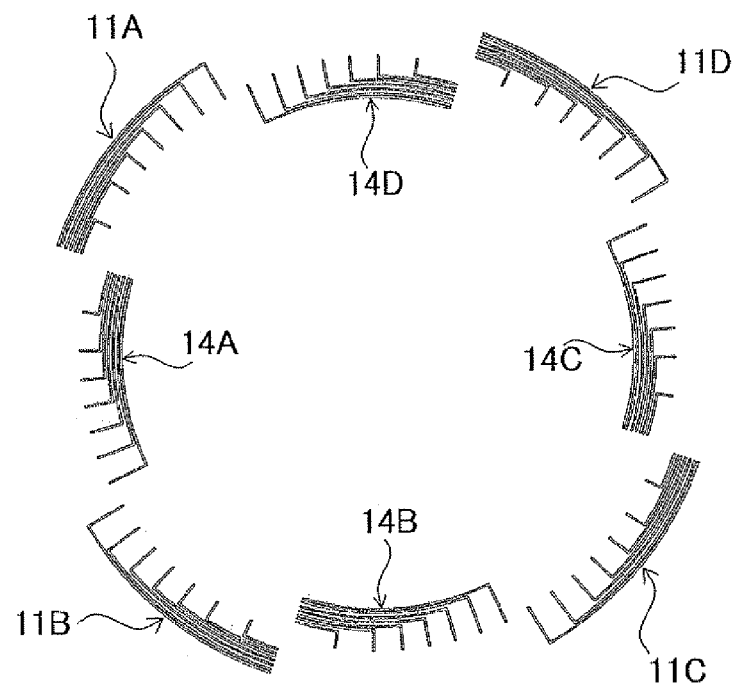
FIG. 14 is a plan view selectively illustrating only a SIN first coil and a SIN fourth coil shown in FIG. 13 in the first embodiment.

FIG. 13 is a plan view of the first coil layer 3. A coil pattern of the first coil layer 3 is formed in a manner that the pattern is drawn by printing using a conductive ink on the surface of the first insulation layer 2 and then burnt. The first coil layer 3 having a substantially annular shape includes four SIN first coils 11A, 11B, 11C, and 11D constituting the SIN signal detection coil 10 placed on an outer circumferential side and in different positions from each other by an electrical angle of 180° (a mechanical angle of 90°) as shown in FIG. 13. The first coil layer 3 further includes four SIN fourth coils 14A, 14B, 14C, and 14D constituting the SIN signal detection signal 10 placed on an inner circumferential side and in different positions from each other by an electrical angle of 180° (a mechanical angle of 90°) as shown in FIG. 13. FIG. 14 is a plan view selectively illustrating only the SIN first coils 11A-11D and the SIN fourth coils 14A-14D shown in FIG. 13. Those SIN fourth coils 14A-the 14D are placed in positions counterclockwise displaced by an electrical angle of 90° (a mechanical angle of 45°) from the SIN first coils 11A-11D respectively.

Figure 15:
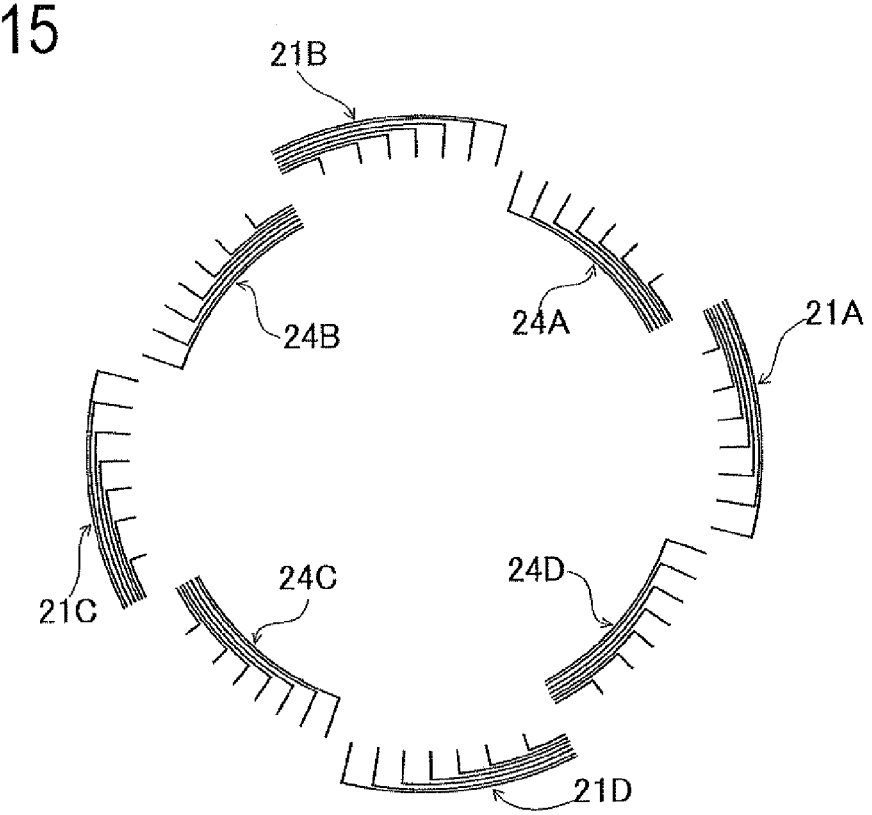
FIG. 15 is a plan view selectively illustrating only a COS first coil and a COS fourth coil shown in FIG. 13 in the first embodiment.

As shown in FIG. 13, on the inner circumferential side of the SIN first coils 11A-11D, COS fourth coils 24B, 24C, 24D, and 24A constituting the COS signal detection coil 20 are arranged. On the outer circumferential side of the SIN fourth coils 14A-14D, COS first coils 21C, 21D, 21A, and 21B constituting the COS signal detection coil 20 are arranged. FIG. 15 is a plan view selectively illustrating only the COS first coils 21A-21D and the COS fourth coils 24A-24D shown in FIG. 13. Those COS first coils 21A-21D are placed in positions clockwise displaced by an electrical angle of 90° (a mechanical angle of 45°) from the COS fourth coils 24A-24D respectively.

Figure 16:
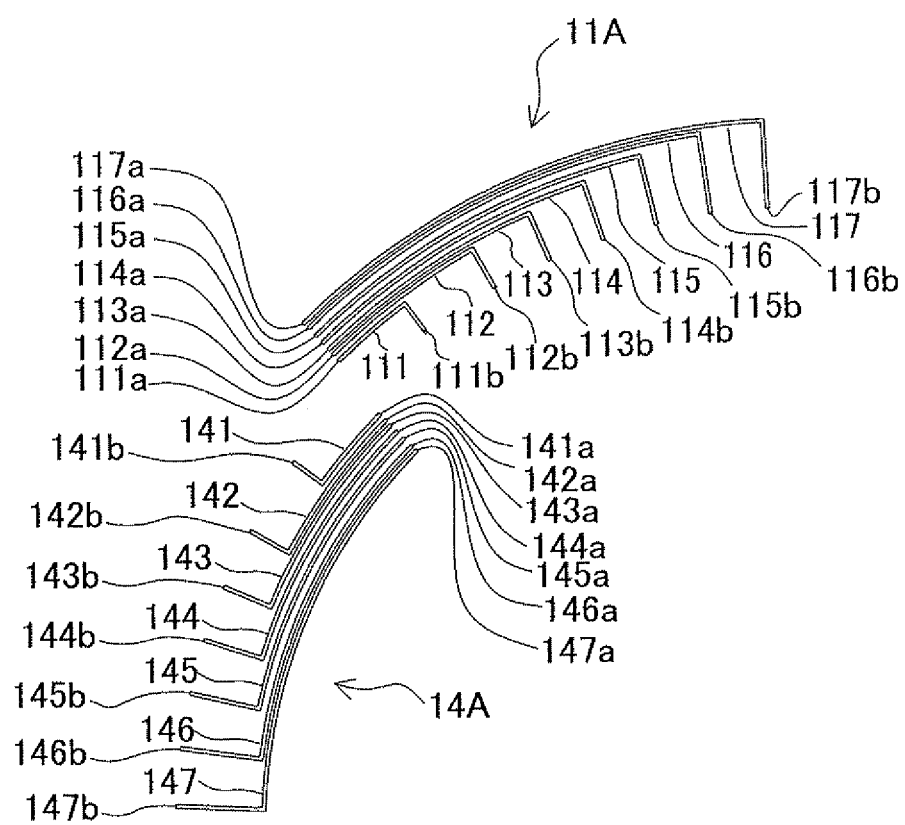
FIG. 16 is an enlarged plan view selectively illustrating only parts of the SIN first coil and the SIN fourth coil shown in FIGS. 13 and 14 to show a relationship between the SIN first coil and the SIN fourth coil in the first embodiment.

FIG. 16 is an enlarged plan view selectively illustrating only the SIN first coil 11A and the SIN fourth coil 14A shown in FIGS. 13 and 14 to show a relationship between the SIN first coils 11A-11D and the SIN fourth coils 14A-14D. As shown in FIG. 16, the SIN first coil 11A includes seven coil wires 111, 112, 113, 114, 115, 116, and 117 constituting a quarter of a nearly rectangular shape. Those coil wires 111-117 are formed and arranged so that they are gradually larger from the inner circumferential side to the outer circumferential side. The coil wires 111-117 respectively include first ends 111a, 112a, 113a, 114a, 115a, 116a, and 117a and second ends 111b, 112b, 113b, 114b, 115b, 116b, and 117b. Similarly, the SIN fourth coil 14A includes seven coil wires 141, 142, 143, 144, 145, 146, and 147 constituting a quarter are formed and arranged so that they are gradually larger from the outer circumferential side to the inner circumferential side. The coil wires 141-147 respectively include first ends 141a, 142a, 143a, 144a, 145a, 146a, and 147a and second ends 141b, 142b, 143b, 144b, 145b, 146b, and 147b.

As shown in FIG. 9, inside the SIN third coils 13A-13D and the COS third coils 23A-23D arranged annularly, an annular coil 31 constituting the stator-side rotary transformer 30 is placed. Furthermore, outside the SIN second coils 12A-12D and the COS second coils 22A-22D arranged annularly, as shown in FIG. 9, the connecting wires 15b, 15e, 25b, 25d, and 25e and the terminals 17 and 27 are placed.

Similarly, as shown in FIG. 13, inside the SIN fourth coils 14A-14D and the COS fourth coils 24A-24D arranged annularly, an annular coil 32 constituting the stator-side rotary transformer 30 is placed. Furthermore, outside the SIN first coils 11A-11D and the COS first coils 21A-21D, as shown in FIG. 13, the connecting wires 15a, 15c, 15d, and 25a-25e and the terminals 16, 26, 35, and 36 are placed.

The details of the configuration of the SIN signal detection coil 10 are explained below referring to FIGS. 3-16. The positive terminal 16 shown in FIG. 13 is a terminal used for the SIN signal detection coil 10. This positive terminal 16 is connected to the end 127a of the coil wire 127 of the SIN second coil 12B shown in FIGS. 9 and 12 with the first-end connecting wire 15d through the through hole 4a formed in the second insulation layer 4. The end 127b of the coil wire 127 of the SIN second coil 12B is connected to the end 147b of the coil wire 147 of the SIN fourth coil 14B shown in FIGS. 13 and 16 through the through hole 4a of the second insulation layer 4. The end 147a of the coil wire 147 of the SIN fourth coil 14B is connected to the end 137a of the coil wire 137 of the SIN third coil 13B shown in FIGS. 9 and 12 through the through hole 4a of the second insulation layer 4. The end 137b of the coil wire 137 of the SIN third coil 13B is connected to the end 117b of the coil wire 117 of the SIN first coil 11B shown in FIGS. 13 and 16 through the through hole 4a of the second insulation layer 4. In the above manner, the coil wires 127, 147, 137, and 117 located respectively on the outermost circumference of the SIN second coil 12B, the SIN fourth coil 14B, the SIN third coil 13B, and the SIN first coil 11B constitute an outermost circumferential winding part (turn).

The end 117a of the coil wire 117 of the SIN first coil 11B shown in FIGS. 13 and 16 is connected to the end 126a of the coil wire 126 of the SIN second coil 12B shown in FIGS. 9 and 12 through the through hole 4a of the second insulation layer 4. As with the aforementioned outermost circumferential coil wires 127, 147, 137, and 117 of the SIN second coil 12B, SIN fourth coil 14B, SIN third coil 13B, and SIN first coil 11B, the coil wires 126, 146, 136, and 116 of the SIN second coil 12B, the SIN fourth coil 14B, the SIN third coil 13B, and the SIN first coil 11B constitute an inner turn immediately adjacent to the outermost circumferential turn. The other inner coils are similarly constituted in sequence and, finally, the innermost circumferential coil wires 121, 141, 131, and 111 of the SIN second coil 12B, SIN fourth coil 14B, SIN third coil 13B, and SIN first coil 11B constitute an innermost circumferential turn. In the above manner, the SIN second coil 12B, SIN fourth coil 14B, SIN third coil 13B, and SIN first coil 11B constitute the circular-arc coil 10B in the form of a spiral coil wound clockwise (in a forward direction).

The end 111a of the coil wire 111 of the SIN first coil 11B constituting the innermost circumferential turn of the circular-arc coil 10B is connected to the end 121a of the innermost circumferential coil wire 121 of the SIN second coil 12A shown in FIGS. 9 and 12 through the intermediate connecting wire 15a shown in FIG. 13. The end 121b of the coil wire 121 of the SIN second coil 12A is connected to the end 141b of the coil wire 141 of the SIN fourth coil 14A shown in FIGS. 13 and 16 through the through hole 4a of the second insulation layer 4. The end 141a of the coil wire 141 of the SIN fourth coil 14A is connected to the end 131a of the coil wire 131 of the SIN third coil 13A shown in FIGS. 9 and 12 through the through hole 4a of the second insulation layer 4. The end 131b of the coil wire 131 of the SIN third coil 13A is connected to the end 111b of the coil wire 111 of the SIN first coil 11A shown in FIGS. 13 and 16 through the through hole 4a of the second insulation layer 4. In the above manner, the innermost circumferential coil wires 121, 141, 131, and 111 of the SIN second coil 12A, SIN fourth coil 14A, SIN third coil 13A, and SIN first coil 11A constitute an innermost circumferential turn.

Furthermore, the end 111a of the coil wire 111 of the SIN first coil 11A shown in FIGS. 13 and 16 is connected to the end 122a of the coil wire 122 of the SIN second coil 12A shown in FIGS. 9 and 12 through the through hole 4a of the second insulation layer 4. As with the aforementioned innermost circumferential coil wires 121, 141, 131, and 111 of the SIN second coil 12A, SIN fourth coil 14A, SIN third coil 13A, and SIN first coil 11A, the coil wires 122, 142, 132, and 112 of the SIN second coil 12A, SIN fourth coil 14A, SIN third coil 13A, and SIN first coil 11A constitute an outer turn immediately adjacent to the innermost circumferential turn. The other outer coils are similarly constituted in sequence and, finally, the outermost circumferential coil wires 127, 147, 137, and 117 of the SIN second coil 12A, SIN fourth coil 14A, SIN third coil 13A, and SIN first coil 11A constitute an outermost circumferential turn. In the above manner, the SIN second coil 12A, SIN fourth coil 14A, SIN third coil 13A, and SIN first coil 11A constitute the circular-arc coil 10A in the form of a spiral coil wound counterclockwise (in a reverse direction).

Similarly, the SIN first coil 11D, SIN third coil 13D, SIN fourth coil 14D, and SIN second coil 12D constitute the circular-arc coil 10D in the form of a clockwise winding spiral coil. Furthermore, the SIN second coil 12C, SIN fourth coil 14C, SIN third coil 13C, and SIN first coil 11C constitute the circular-arc coil 10C in the form of a counterclockwise winding spiral coil.

The four circular-arc coils 10A, 10B, 10C, and 10D each configured as above constitute the SIN signal detection coil 10 having a substantially annular shape.

The COS signal detection coil 20 also consists of four circular-arc coils 20A, 20B, 20C, and 20D separated in the circumferential direction. One circular-arc coil 20A consists of the COS first coil 21A, COS second coil 22A, COS third coil 23A, and COS fourth coil 24A. Herein, the COS first coil 21A and the COS fourth coil 24A are formed in the first coil layer 3 as shown in FIG. 13, while the COS second coil 22A and COS third coil 23A are formed in the second coil layer 5 as shown in FIG. 9.

The other circular-arc coils 20B, 20C, and 20D are also configured basically as with the aforementioned circular-arc coil 20A. The COS signal detection coil 20 is connected to the positive terminal 26 and the negative terminal 27 shown in FIGS. 9 and 13. The two circular-arc coils 20A and 20C constituting the COS signal detection coil 20 are each configured as a counterclockwise (reverse-direction) winding spiral coil by running back and forth between the first coil layer 3 and the second coil layer 5. The other two circular-arc coils 20B and 20D constituting the COS signal detection coil 20 are each configured as a clockwise (forward-direction) winding spiral coil by running back and forth between the first coil layer 3 and the second coil layer 5.

Figure 17:
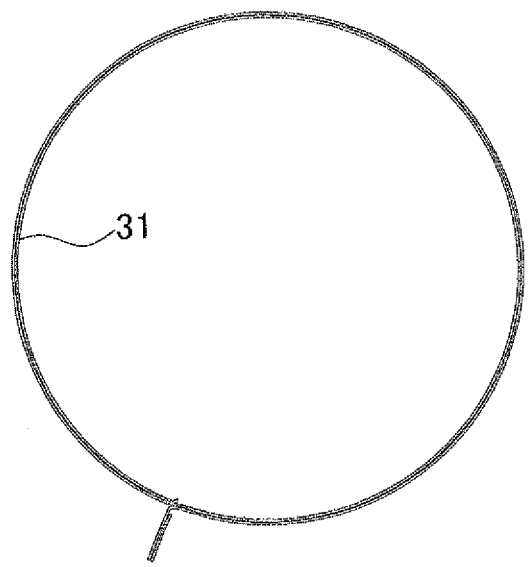
FIG. 17 is a plan view selectively illustrating only a coil shown in FIG. 9 in the first embodiment.
Figure 18:
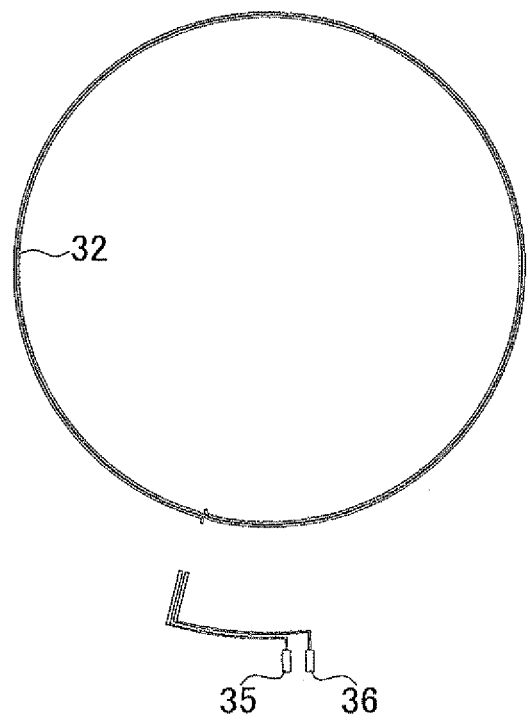
FIG. 18 is a plan view selectively illustrating only a coil shown in FIG. 13 in the first embodiment.

FIG. 17 is a plan view selectively illustrating only the coil 31 illustrated in FIG. 9. FIG. 18 is a plan view selectively illustrating only the coil 32 shown in FIG. 13. Those coils 31 and 32 constitute the stator-side rotary transformer 30 and are connected respectively to the terminals 35 and 36 shown in FIGS. 13 and 18.

Figure 19:
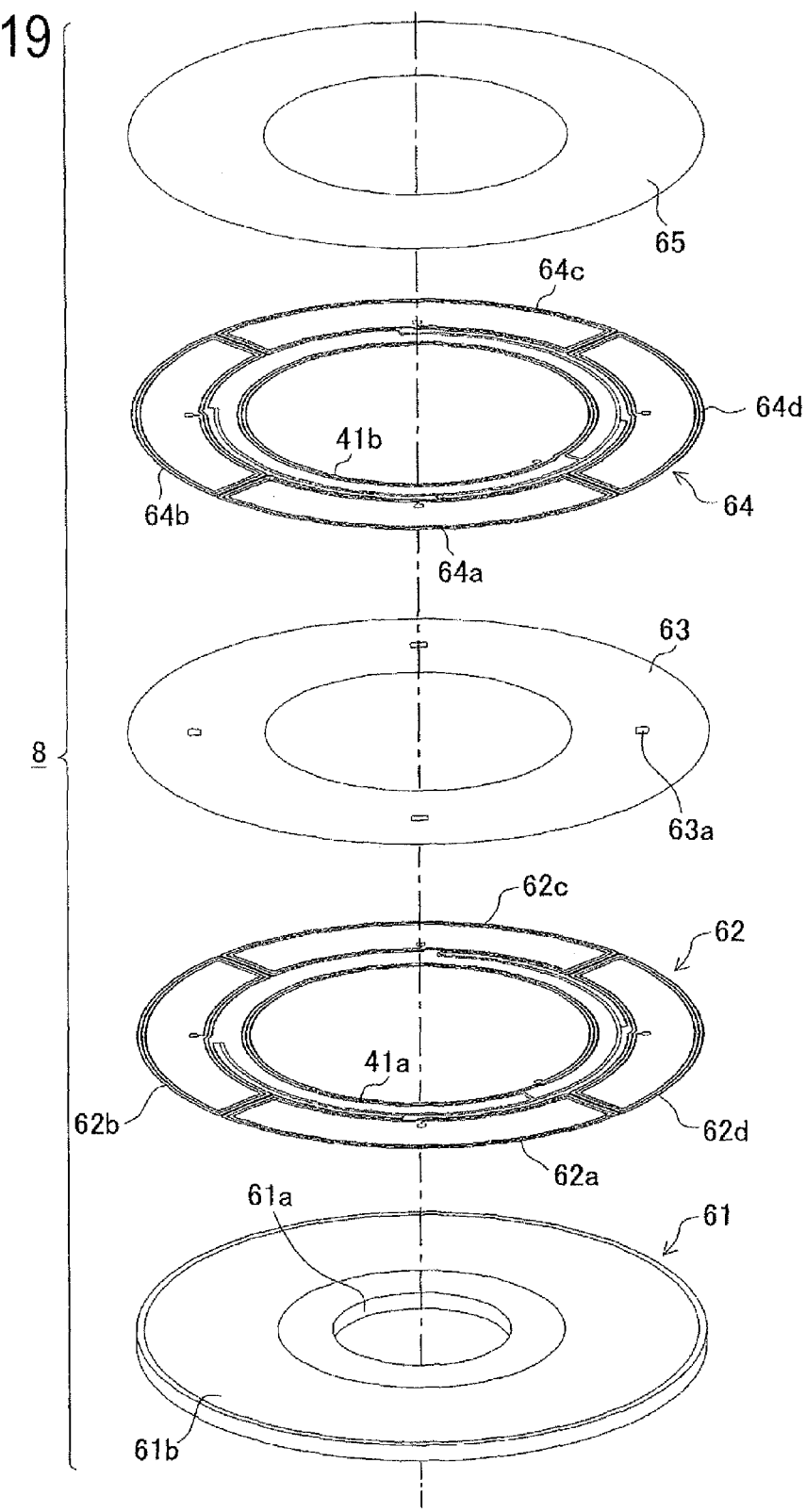
FIG. 19 is an exploded perspective view of a sensor rotor in the first embodiment.

The details of the configuration of the sensor rotor 8 are explained below. FIG. 19 is an exploded perspective view of the configuration of the sensor rotor 8. The sensor rotor 8 includes, from bottom, as shown in FIG. 19, a rotor substrate 61, a first coil layer 62 formed on a main surface (an upper surface in FIG. 19) of the rotor substrate 61, an insulation layer 63 formed on the first coil layer 62, a second coil layer 64 formed on the insulation layer 63, and an overcoat 65 formed as a protective film on the second coil layer 64.

The rotor substrate 61 is made of non-magnetic conductive metal such as aluminum or brass into an annular shape including a circular hole 61a at the center. The rotor substrate 61 is formed, on the main surface, with a recess 61b. In this recess 61b, a resin such as PPS is filled and solidified.

The insulation layer 63 and the overcoat 65 are each made of an insulating material into an annular thin-sheet shape. The insulation layer 63 is formed with a plurality of through holes 63a in places.

The first coil layer 62 includes four circular-arc coils 62a, 62b, 62c, and 62d arranged to take an annular shape as a whole. The second coil layer 64 also includes four circular-arc coils 64a, 64b, 64c, and 64d arranged to take an annular shape as a whole. One ends of the circular-arc coils 62a-62d constituting the first coil layer 62 are connected to one end of the coil 41a constituting the rotor-side rotary transformer 41. The other ends of the four coils 62a-62d pass through the through hole 63 of the insulation layer 63 and then are connected to one ends of the circular-arc coils 64a-64d constituting the second coil layer 64. The other ends of the four coils 64a-64d are connected to one end of the coil 41b constituting the rotor-side rotary transformer 41. The other end of the coil 41a and the other end of the coil 41b are connected to each other through the through hole 63a of the insulation layer 63.

The four circular-arc coils 62a-62d constituting the first coil layer 62 and the four circular-arc coils 64a-64d constituting the second coil layer 64 described above constitute the excitation coil 40.

According to the angle sensor 9 in the present embodiment described above, as shown in FIG. 6, the SIN signal detection coil 10 constituting the sensor stator 7 includes the series of forward-direction circular-arc coils 10B and 10D and reverse-direction circular-arc coils 10A and 10C alternately arranged in the circumferential direction on the stator substrate 1 and connected in series. One of both ends of the series of circular-arc coils 10A-10D connected in series is connected to the positive terminal 16 through the first-end connecting wire 15d and the other end is connected to the negative terminal 17 through the second-end connecting wire 15e. Herein, the connecting wires 15a-15e are placed along the arrangement of the series of circular-arc coils 10A-10D but each less than a full circle of the outer circumference of the series-connected coils 10A-10D. Furthermore, the turn-back connecting wire (the second-end connecting wire) 15e connected to the one end 10a of the series of coils 10A-10D is placed to extend from this end 10a which is a turn-back point along the other connecting wires 15a-15d, and connected to the negative terminal 17. Accordingly, of the connecting wires 15a-15e connected to either end of the series of circular-arc coils 10A-10D, the turn-back connecting wire (the second-end connecting wire) 15e connected to the end 10a is placed along the other connecting wires 15a-15d, so that the connecting wires 15a-15e do not substantially form a loop antenna as a whole. Therefore, the entire connecting wires 15a-15e can be made hard to be affected by external electromagnetic noise. Since the turn-back connecting wire (the second-end connecting wire) 15e is placed along the other connecting wires 15a-15d, electric current flows in opposite directions between the connecting wire 15e and the connecting wires 15a-15d. Thus, electromagnetic noise externally entering the turn-back connecting wire (the second-end connecting wire) 15e and electromagnetic noise externally entering the other connecting wires 15a-15d cancel each other out. This can reduce the influence of external electromagnetic noise on the SIN signal detection coil 10.

According to the angle sensor 9 in the present embodiment, as shown in FIG. 7, the COS signal detection coil 20 constituting the sensor stator 7 includes the series of forward-direction circular-arc coils 20B and 20D and reverse-direction circular-arc coils 20A and 20C alternately arranged in the circumferential direction on the stator substrate 1 and connected in series. One of both ends of the series of circular-arc coils 20A-20D connected in series is connected to the positive terminal 26 through the first-end connecting wire 25d while the other end is connected to the negative terminal 27 through the second-end connecting wire 25e. Herein, the connecting wires 25a-25e are placed along the arrangement of the series of circular-arc coils 20A-20D but each less than a full circle of the outer circumference of the series-connected coils 20A-20D. Furthermore, the turn-back connecting wire (the second-end connecting wire) 25e connected to the one end 20a of the series of coils 20A-20D is placed to extend from this end 20a which is a turn-back point along the other connecting wires 25a-25d, and connected to the negative terminal 27. Accordingly, as to the connecting wires 25a-25e connected to either end of the series of circular-arc coils 20A-20D, the turn-back connecting wire (the second-end connecting wire) 25e connected to the one end 20a is placed along the other connecting wires 25a-25d, so that the connecting wires 25a-25e do not substantially form a loop antenna as a whole. Therefore, the entire connecting wires 25a-25e can be made hard to be affected by external electromagnetic noise. Since the turn-back connecting wire (the second-end connecting wire) 25e is placed along the other connecting wires 25a-25d, electric current flows in opposite directions between the connecting wire 25e and the connecting wires 25a-25d. Thus, electromagnetic noise externally entering the turn-back connecting wire (the second-end connecting wire) 25e and electromagnetic noise externally entering the other connecting wires 25a-25d cancel each other out. This can reduce the influence of external electromagnetic noise on the COS signal detection coil 20. As above, since it is possible to reduce the influence of electromagnetic noise on the SIN signal detection coil 10 and the COS signal detection coil 20, the angle. sensor 9 can achieve enhanced detection accuracy and performance.

In the present embodiment, in the SIN signal detection coil 10, the turn-back connecting wire (the second-end connecting wire) 15e and the other connecting wires 15a-15d are located radially outside the series of circular-arc coils 10A-10D connected in series. This makes it hard for electromagnetic noise to externally enter the series of circular-arc coils 10A-10D located inside the connecting wires 15a-15d. Since the turn-back connecting wire (the second-end connecting wire) 15e and the other connecting wires 15a-15d are placed one above the other to be adjacent in a vertical direction, the space between the turn-back connecting wire (the second-end connecting wire) 15e and the other connecting wires 15a-15d is small. In this regard, the connecting wires 15a-15e are more unlikely to be affected by external electromagnetic noise. The same applies to the connecting wires 25a-25e of the COS signal detection coil 20.

In the present embodiment, especially, the turn-back connecting wire (the second-end connecting wire) 15e and the other connecting wires 15a-15d are arranged to overlap one above the other in parallel, so that the area between the turn-back connecting wire (the second-end connecting wire) 15e and the other connecting wires 15a-15d is substantially zero. Accordingly, the connecting wires 15a-15e are more unlikely to be affected by the external electromagnetic noise. The same applies to the connecting wires 25a-25e of the COS signal detection coil 20.

Figure 20:
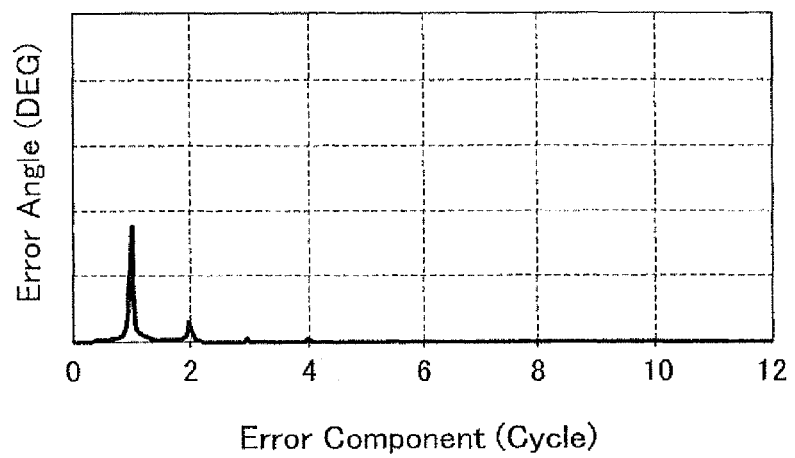
FIG. 20 is a graph showing a relationship between error component and error angle in the angle sensor of the first embodiment.
Figure 21:
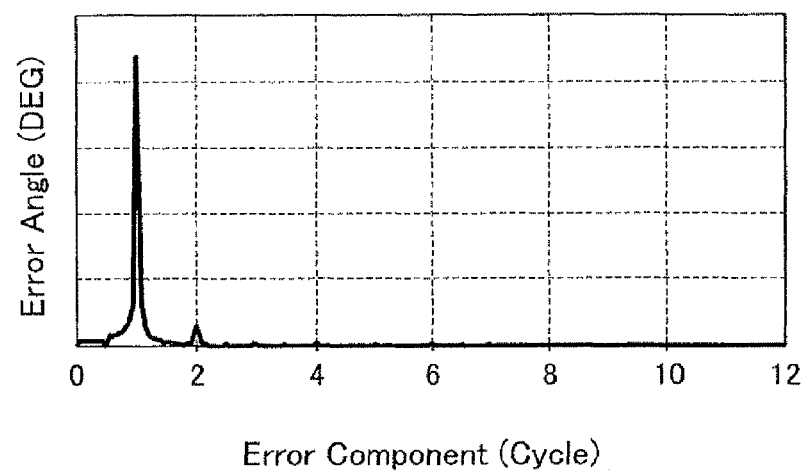
FIG. 21 is a graph showing a relationship between error component and error angle in an angle sensor of a comparative example to the first embodiment.

FIG. 20 is a graph showing a relationship between error component (cycle) and error angle (DEG) in an angle sensor 9 of the present embodiment. FIG. 21 is a graph showing a relationship between error component (cycle) and error angle (DEG) in an angle sensor of a comparative example (in which connecting wires are placed in a loop antenna pattern). As is clear by comparison between FIGS. 20 and 21, both the angle sensor 9 of the present embodiment and the angle sensor of the comparative example generate primary errors between the error components "0 to 2". It is also found that the angle sensor 9 of the present embodiment could reduce the primary errors by about 60% with respect to the angle sensor of the comparative example. This reveals that the angle sensor 9 of the present embodiment can reduce the influence of external electromagnetic noise.

In addition, according to the angle sensor 9 of the present embodiment, in the SIN signal detection coil 10 of the sensor stator 7, each of the circular-arc coils 10A-10D connected in series through the connecting wires 15a-15g has a symmetric shape about the symmetry axis L1 extending in a radial direction by passing the center in the circumferential direction. Furthermore, the one end 10b and the other end 10c of each of the circular-arc coils 10A-10D connected to the corresponding connecting wire 15a-15g are located on the symmetry axis L1. Thus, the shape of each circular-arc coil 10A-10D has a good symmetric property for inflow/outflow of electric current in/from each coil 10A-10D. Similarly, in the COS signal detection coil 20 of the sensor stator 7, each of the circular-arc coils 20A-20D connected in series through the connecting wires 25a-25g has a symmetric shape about the symmetry axis L1 extending in a radial direction by passing the center in the circumferential direction. Furthermore, the one end 20b and the other end 20c of each of the circular-arc coils 20A-20D connected to the corresponding connecting wire 25a-25g are located on the symmetry axis L1. Thus, the shape of each circular-arc coil 20A-20D has a good symmetric property for inflow/outflow of electric current in/from each coil 20A-20D. Consequently, in each of the circular-arc coils 10A-10D and 20A-20D, the magnetic flux density can be uniformized, the SIN signal detection coil 10 and the COS signal detection coil 20 can provide improved detection accuracy, and hence the angle sensor 9 can achieve enhanced detection accuracy and performance.

According to the present embodiment, to make the coil wire groups 100 and 200 respectively constituting the circular-arc coils 10A-10D and 20A-20D symmetric about the symmetry axis L1, the coil wire groups 100 and 200 are arranged to be displaced in a radial direction in the displaced portions 100a and 200a respectively between the one end 10b and the other end 10e of each circular-arc coil 10A-10D and between the one end 20b and the other end 20c of each circular-arc coil 20A-20D. Thus, the arrangement of the coil wire groups 100 and 200 has a good symmetric property. This makes it possible to further uniformize the magnetic flux density of each of the circular-arc coils 10A-10D and 20A-20D. The detection accuracy of the SIN signal detection coil 10 and the COS signal detection coil 20 can be further improved. Hence; the angle sensor 9 can achieve enhanced detection accuracy and performance.

According to the present embodiment, in each of the circular-arc coils 10A-10D (20A-20D), the first bridging wire 15f (25f) extending from the one end 10b (20b) toward the connecting wires 15a-15e (25a-25e) placed on the outer circumferential side and the second bridging wire 15g (20g) extending from the other end 10c (20c) toward the connecting wires 15a-15e (25a-25e) are placed to overlap one above the other while the second insulation layer 4 (see FIG. 3) is interposed therebetween. Thus, the electric current flows in opposite directions between the first bridging wire 15f (25f) and the second bridging wire 15g (25g). This causes the electromagnetic noise externally entering the first bridging wire 15f (25f) and the electromagnetic noise externally entering the second bridging wire 15g (25g) cancel each other out. Therefore, the external electromagnetic noise is less likely to affect the portions corresponding to the first bridging wires 15f (25f) and the second bridging wires 15g (25g). It is possible to reduce the influence of external electronic noise on each of the circular-arc coils 10A-10D (20A-20D). Hence, the angle sensor 9 can further enhanced detection accuracy and performance.

Figure 22:
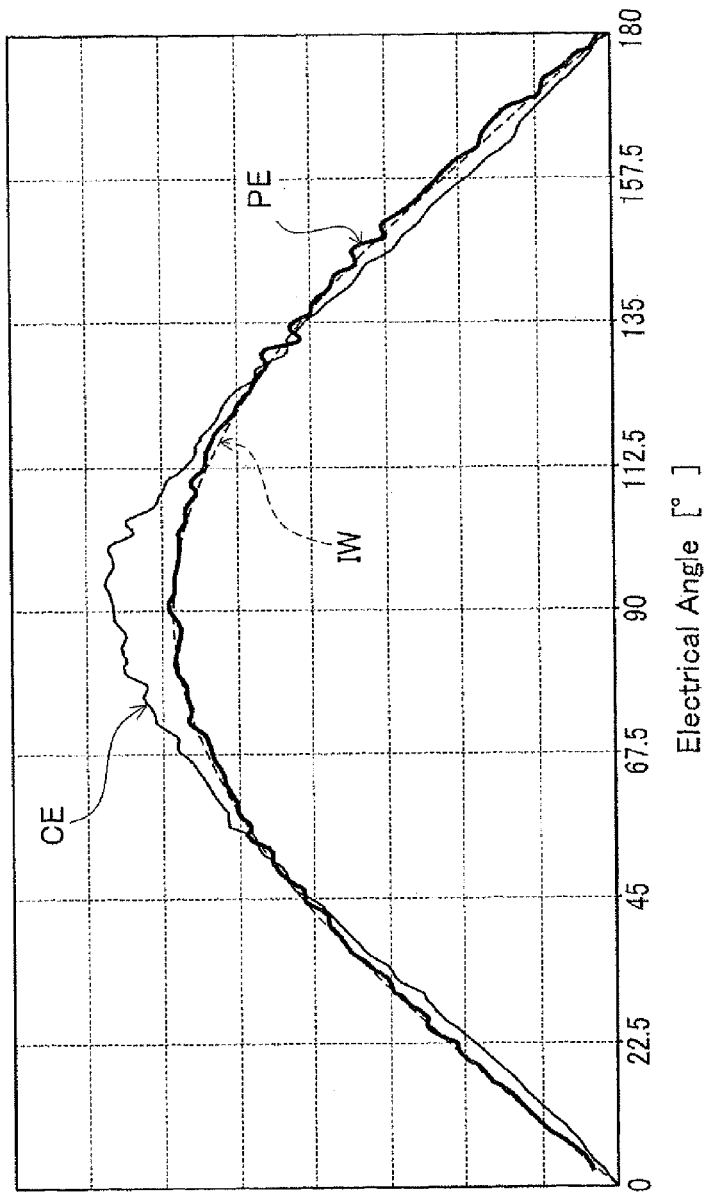
FIG. 22 is a graph showing a relationship of output waveform of the angle sensor to electrical angles in the first embodiment.

FIG. 22 is a graph showing a relationship of output waveform of the angle sensor to electrical angle. In FIG. 22, a thick line represents a waveform in the present embodiment, a solid line represents a waveform in the comparative example (the symmetric property of each circular-arc coil is not improved), and a broken line represents an ideal waveform. This graph reveals the following results. The waveform in the present embodiment substantially conforms to the ideal waveform and thus the angle sensor provides a good symmetric property and an improved error performance. In contrast, the waveform in the comparative example greatly deviates, in its peak range, from the ideal waveform and thus the angle sensor provides a poor symmetric property and a low error performance. In this regard, the angle sensor 9 of the present embodiment can achieve improved error performance and enhanced detection accuracy.

The angle sensor 9 of the present embodiment includes the sensor stator 7 and the sensor rotor 8, and the sensor stator 7 consists of the stator substrate 1, the first insulation layer 2, the first coil layer 3, the second insulation layer 4, the second coil layer 5, and the overcoat 6. Herein, the first coil layer 3 and the second coil layer 5 formed by interposing the second insulation layer 4 therebetween constitute the SIN signal detection coil 10 and the COS signal detection coil 20. The circular-arc coils 10A-10D constituting the SIN signal detection coil 10 are each configured by connecting wires divided into two in the circumferential direction and further divided into two in the radial direction. Specifically, in the circular-arc coils 10A-10D, the SIN first coils 11A-11D and the SIN second coils 12A-12D are placed on the outer circumferential side and the SIN third coils 13A-13D and the SIN fourth coils 14A-14D are placed on the inner circumferential side. The SIN first coils 11A-11D and the SIN third coils 13A-13D are placed to face each other in the radial direction, while the SIN second coils 12A-12D and the SIN fourth coils 14A-14D are placed to face each other in the radial direction. The SIN first coils 11A-11D and the SIN fourth coils 14A-14D are located in the first coil layer 3, while the SIN second coils 12A-12D and the SIN third coils 13A-13D are located in the second coil layer 5.

The circular-arc coils 20A-20D constituting the COS signal detection coil 20 are each configured by connecting wires divided into two in the circumferential direction and further divided into two in the radial direction. Specifically, in the circular-arc coils 20A-20D, the COS first coils 21A-21D and the COS second coils 22A-22D are placed on the outer circumferential side and the COS third coils 23A-23D and the COS fourth coils 24A-24D are placed on the inner circumferential side. The COS first coils 21A-21D and the COS third coils 23A-23D are placed to face each other in the radial direction, while the COS second coils 22A-22D and the COS fourth coils 24A-24D are placed to face each other in the radial direction. The COS first coils 21A-21D and the COS fourth coils 24A-24D are located in the first coil layer 3. The COS second coils 22A-22D and the COS third coils 23A-23D are located in the second coil layer 5. Accordingly, even when the stator substrate 1 itself is deformed, e.g., undulated, in the circumferential direction, the SIN first coils 11A-11D (the SIN fourth coils 14A-14D) and the SIN second coils 12A-12D (the SIN third coils 13A-13D) will cancel out any errors generated due to the deformation such as undulation. Similarly, the COS first coils 21A-21D (the COS fourth coils 24A-24D) and the COS second coils 22A-22D (the COS third coils 23A-23D) will cancel out any errors generated due to the deformation such as undulation. Also in this light, the high-accurate angle sensor 9 with less detection error can be achieved.

Specifically, the SIN first coils 11A-11D are formed in the first coil layer 3, the SIN second coils 12A-12D are formed in the second coil layer 5, the SIN third coils 13A-13D are formed in the second coil layer 5, and the SIN fourth coils 14A-14D are formed in the first coil layer 3. Accordingly, even if the SIN first coils 11A-11D and the SIN fourth coils 14A-14D formed in the first coil layer 3 and the SIN second coils 12A-12D and the SIN third coils 13A-13D formed in the second coil layer 5 receive different magnetic flux densities from each other due to gaps generated by the deformation of the stator substrate 1 in the circumferential direction, the entire SIN signal detection coil 10 (SIN first coils 11A-11D, SIN second coils 12A-12D, SIN third coils 13A-13D, and SIN fourth coils 14A-14D) can cancel out the errors.

Similarly, the COS first coils 21A-21D are formed in the first coil layer 3, the COS second coils 22A-22D are formed in the second coil layer 5, the COS third coils 23A-23D are formed in the second coil layer 5, and the COS fourth coils 24A-24D are formed in the first coil layer 3. Therefore, even if the COS first coils 21A-21D and the COS fourth coils 24A-24D formed in the first coil layer 3 and the COS second coils 22A-22D and the COS third coils 23A-23D formed in the second coil layer 5 receive different magnetic flux densities from each other due to gaps generated by the deformation in the circumferential direction, the entire COS signal detection coil 20 (COS first coils 21A-21D, COS second coils 22A-22D, COS third coils 23A-23D, and COS fourth coils 24A-24D) can cancel out the errors.

In the present embodiment, a set of the SIN first coils 11A-11D and the SIN third coils 13A-13D and a set of the COS second coils 22A-22D and the COS fourth coils 24A-24D are located in the same position in the circumferential direction, while a set of the SIN second coils 12A-12D and the SIN fourth coils 14A-14D and a set of the COS first coils 21A-21D and the third coils 23A-23D are located in the same direction in the circumferential direction. Accordingly, a positional relationship between the SIN signal detection coil 10 and the COS signal detection coil 20 can be kept constant with respect to the excitation coil 40.

In the present embodiment, the SIN first coils 11A-11D and the SIN second coils 12A-12D are connected to each other through the through hole 4a of the second insulation layer 4. The SIN second coils 12A-12D and the SIN fourth coils 14A-14D are connected to each other through the through hole 4a of the second insulation layer 4. The SIN fourth coils 14A-14D and the SIN third coils 13A-13D are connected to each other through the through hole 4a of the second insulation layer 4. Furthermore, the SIN third coils 13A-13D and the SIN first coils 11A-11D are connected to each other through the through hole 4a of the second insulation layer 4. Similarly, the COS first coils 21A-21D and the COS coils 22A-22D are connected to each other through the through hole 4a of the second insulation layer 4. The COS second coils 22A-22D and the COS fourth coils 24A-24D are connected to each other through the through hole 4a of the second insulation layer 4. The COS fourth coils 24A-24D and the COS third coils 23A-23D are connected to each other through the through hole 4a of the second insulation layer 4. Moreover, the COS third coils 23A-23D and the COS first coils 21A-21D are connected to each other through the through hole 4a of the second insulation layer 4. Accordingly, the SIN signal detection coil 10 and the COS signal detection coil 20 can be manufactured with ease and high positional accuracy. Even if the coils receive different magnetic flux densities due to the gaps caused by deformation of the stator substrate 1 in the circumferential direction, the entire SIN signal detection coil 10 (SIN first coils 11A-11D, SIN second coils 12A-12D, SIN third coils 13A-13D, and SIN fourth coils 14A-14D) can cancel out any errors reliably and precisely.

In the present embodiment, the first coil layer 3 and the second coil layer 5 are formed respectively by being drawn by printing using a conductive ink on the insulation layers 2 and 4 and then burnt. Even when a deviation is present between the first coil layer 3 and the second coil layer 5 due to burning, accordingly, the above configuration resistance values of the SIN signal detection coil 10 and the COS signal detection coil 20 are respectively averaged, enabling mutual cancellation of resistance values, thus reducing a deterioration in detection accuracy.

According to the present embodiment, the SIN signal detection coil 10 and the COS signal detection coil 20 constitute a single detection coil, so that the high accurate angle sensor 9 capable of generating a constant induced voltage to a predetermined magnetic field can be obtained.

<Second Embodiment>

A second embodiment of the angle sensor according to the invention will be explained in detail below referring to accompanying drawings.

Figure 23:
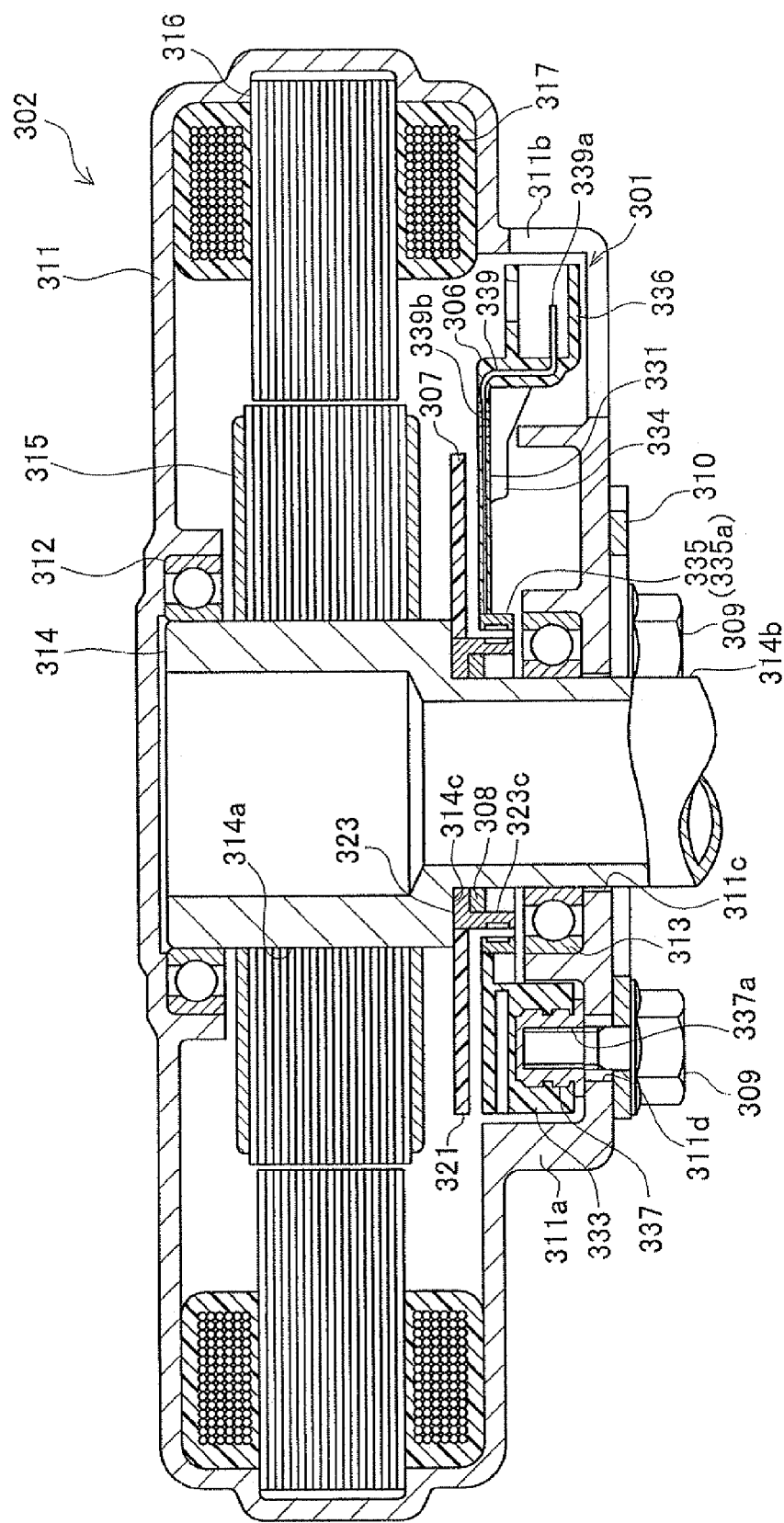
FIG. 23 is a front cross sectional view showing an angle sensor and a motor in which the angle sensor is mounted in a second embodiment.

FIG. 23 is a front cross sectional view showing an angle sensor 301 in the present embodiment and a motor 302 in which the angle sensor 301 is mounted (hereinafter, the orientation in FIG. 23 is referred as a front view for convenience). The motor 302 includes a motor housing 311 having a nearly circular disc-like appearance, a rotary shaft 314 housed in the motor housing 311 at the internal center and rotatably supported by bearings 312 and 313, a motor rotor 315 fixed on the outer periphery of the rotary shaft 314 inside the motor housing 311, and a motor stator 316 placed outside the outer periphery of the motor rotor 315 with a gap therebetween and fixed to the inside of the motor housing 311. The motor stator 316 is provided with a coil 317.

In FIG. 23, the motor housing 311 is integrally formed, at its bottom, with a housing part 311a to accommodate the angle sensor 301. This housing part 311a is defined by a substantially annular circumferential wall around the rotary shaft 314 and the bearing 313. The housing part 311a is formed, in a part of its outer periphery, with a through hole 311b communicating with the outside.

The rotary shaft 314 of the motor 302 has a nearly cylindrical shape as shown in FIG. 23, including a large-diameter portion 314a, a small-diameter portion 314b, and a shoulder portion 314c formed at the boundary between the large-diameter portion 314a and the small-diameter portion 314b. The large-diameter portion 314a is supported by the one bearing 312 and placed so that the motor rotor 315 is fixed on the outer periphery. The small-diameter portion 314b is supported by the other bearing 313 and placed so that a distal end portion of the small-diameter portion 314b protrudes out through a shaft hole 311c formed in the bottom wall of the housing part 311a.

The angle sensor 301 includes a sensor stator 306 and a sensor rotor 307 as shown in FIG. 23. The sensor rotor 307 is press-fitted on the outer periphery of the small-diameter portion 314b of the rotary shaft 314 inside the motor housing 311 and further fixed by a ring-shaped stopper 308. In the housing part 311a of the motor housing 311, the sensor stator, 306 is placed about the rotary shaft 314 to face the sensor rotor 307 and externally fixed to the motor housing 311 with a plurality of bolts 309. The bottom wall of the housing part 311a is formed with a plurality of long holes 311d in which the bolts 309 are individually inserted. In the present embodiment, a joint member 310 having a substantially annular shape is interposed between the bolts 309 and the housing part 311a to integrally connect the bolts 309.

Figure 24:
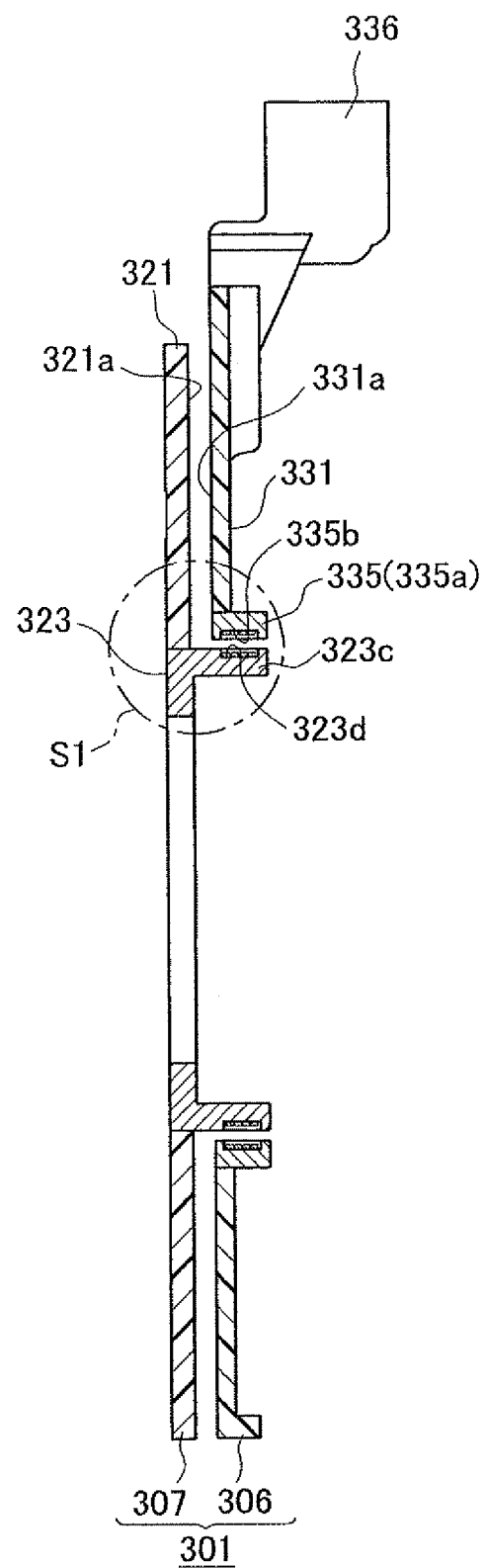
FIG. 24 is a cross sectional view of the angle sensor in the second embodiment.
Figure 25:
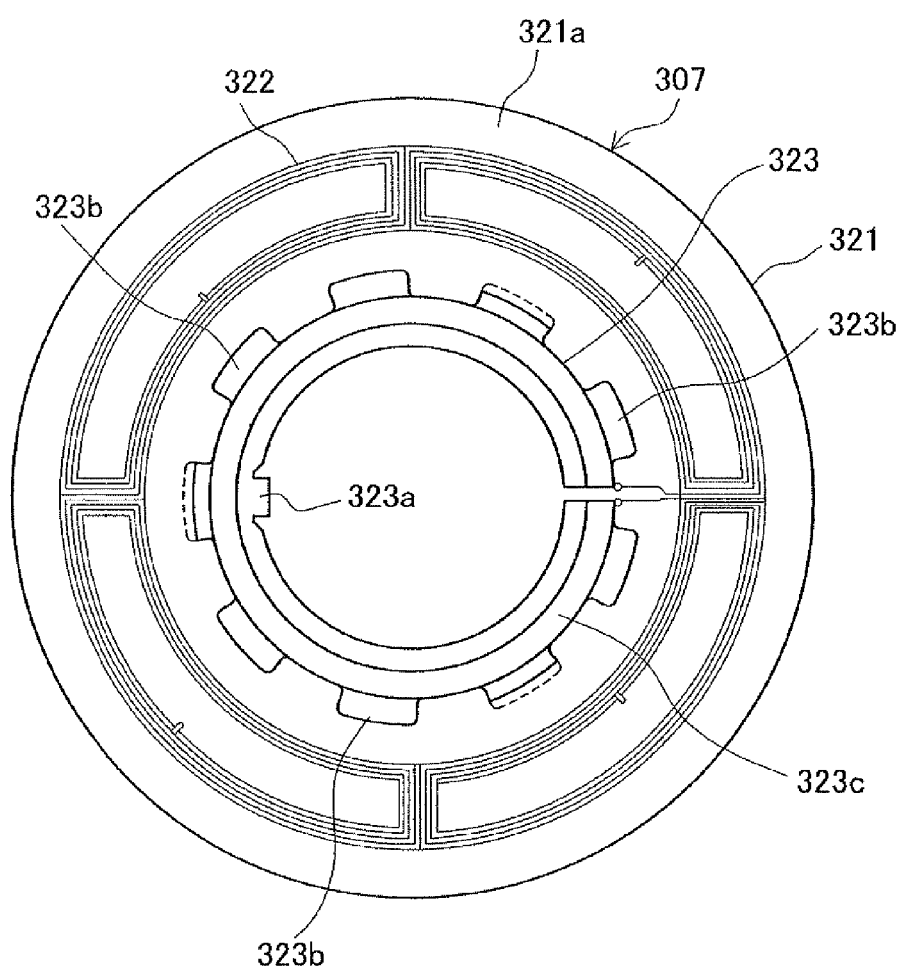
FIG. 25 is a plan view showing a sensor rotor constituting the angle sensor in the second embodiment.
Figure 26:
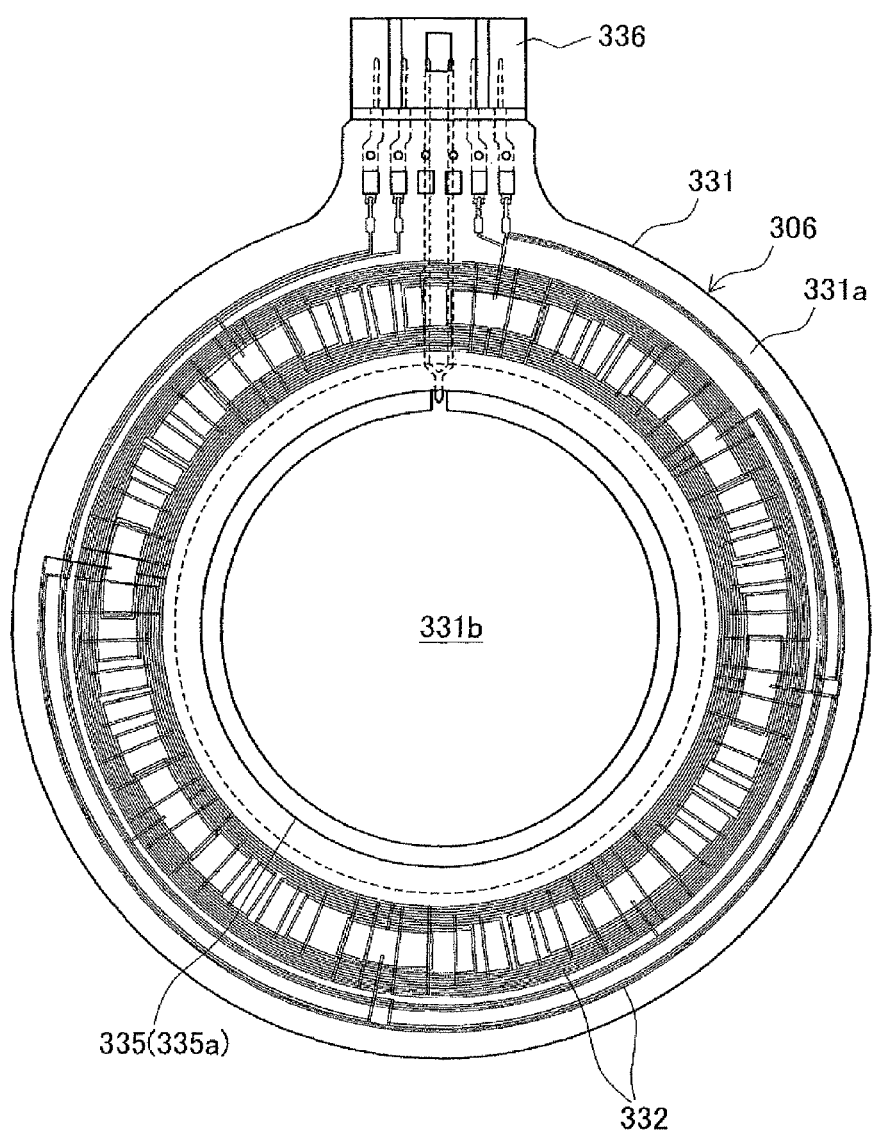
FIG. 26 is a plan view showing a sensor stator constituting the angle sensor in the second embodiment.

FIG. 24 is a cross sectional view of the angle sensor 301 of the present embodiment (fixing protrusion 333 mentioned later is omitted in FIG. 24). FIG. 25 is a plan view of the sensor rotor 307 constituting the angle sensor 301 of the present embodiment. FIG. 26 is a plan view of the sensor stator 306 constituting the angle sensor 301 of the present embodiment. As shown in FIGS. 23-25, the sensor rotor 307 includes a rotor substrate 321 made of resin and shaped like an annular flat plate, a planar coil 322 placed on a main surface 321a (a lower surface in FIG. 23) of the rotor substrate 321, and a rotor-side annular metal member 323 having a substantially annular shape, the metal member 323 being integrally provided on the inner circumferential side of the rotor substrate 321 and contacting with the rotary shaft 314 to fixedly mount the sensor rotor 307 on the outer periphery of the rotary shaft 314.

The rotor substrate 321 is made of PPS resin or the like. The rotor-side annular metal member 323 is made of a magnetic material such as iron. The planar coil 322 is formed on the surface 321a of the rotor substrate 321 by printing using inkjet or other techniques and covered by an insulation layer formed thereon. As shown in FIG. 25, the metal member 323 includes a single protrusion 323a integrally formed on an inner periphery, and a plurality of protrusions 323b integrally formed on an outer periphery to extend radially outward. The protrusions 323b are arranged at equal angular intervals in a radial fashion. The metal member 323 is insert-molded, at an outer circumferential portion including the protrusions 323b, in the rotor substrate 321. Further, the metal member 323 includes an annular facing portion 323c protruding from a main surface of the metal member 323 in the axial direction as shown in FIGS. 23-25.

As shown in FIGS. 23 and 24, the sensor rotor 307 is placed so that the main surface 321a of the rotor substrate 321 faces a main surface 331a (an upper surface in FIG. 23) of the sensor stator 306, and fitted on the outer periphery of the small-diameter portion 314b of the rotary shaft 314. Herein, while the inner periphery of the rotor-side annular metal member 323 is press-fitted on the outer periphery of the small-diameter portion 314b of the rotary shaft 314 and thus positioned by the shoulder portion 314c, the sensor rotor 307 is held against dropping out by the ring-shaped stopper 308. The protrusion 323a of the metal member 323 engages in a key groove (not shown) formed in the small-diameter portion 314b to hold the sensor rotor 307 against rotation with respect to the rotary shaft 314. The sensor rotor 307 is thus fixed so as to be rotatable together with the rotary shaft 314.

As shown in FIGS. 23, 24, and 26, the sensor stator 306 includes a stator substrate 331 made of resin in a substantially annular flat plate shape and having the main surface 331a on which a planar coil 332 is placed, a plurality of fixing protrusions 333 provided on a back surface (a lower surface in FIG. 23) of the stator substrate 331, an outer circumferential rib 334 formed along an outer peripheral edge on the back surface side of the stator substrate 331 and extending in the axial direction, a through hole 331b formed at the center through which the rotary shaft 314 passes, a stator-side annular metal member 335 formed along the inner circumference of the through hole 331b and extending in the axial direction from the back surface side of the stator substrate 331, and a single connector portion 336 extending from the stator substrate 331 to face sideways (in a horizontal direction). The annular metal member 335 is made of a magnetic material such as iron. In the present embodiment, the annular metal member 335 itself serves as an annular facing portion 335a that faces the annular facing portion 323c of the rotor-side annular metal member 323 with a gap therebetween. The outer peripheral rib 334 is continuously integrally formed with the fixing protrusions 333 and the connector portion 336 respectively. As shown in FIG. 26, the planar coil 332 placed on the main surface 331a of the stator substrate 331 is formed by printing using inkjet or other techniques and covered by an insulation layer formed thereon.

As shown in FIGS. 23 and 24, each of the fixing protrusions 333 (only one of them is illustrated in FIG. 23) has a cylindrical shape. In the present embodiment, these protrusions 333 are arranged on the back surface of the stator substrate 331 along the outer circumference and at equal angular intervals. Each protrusion 333 is provided with a metal bush 337 having a screw hole 337a. This metal bush 337 is insert-molded in the protrusion 333. In the metal bushes 337, the bolts 309 are individually screwed to secure the sensor stator 306 to the motor housing 311.

As shown in FIGS. 23, and 24, a plurality of metal terminals 339 are insert-molded in the connector portion 336. Each terminal 339 is formed in a. right-angled bent shape so that a first end 339a is placed in the connector portion 336 and a second end 339b is placed in the stator substrate 331. Each second end 339b placed in the stator substrate 331 is connected to a coil wire constituting the planar coil 332 and also connected to the stator-side annular metal member 335.

Figure 27:
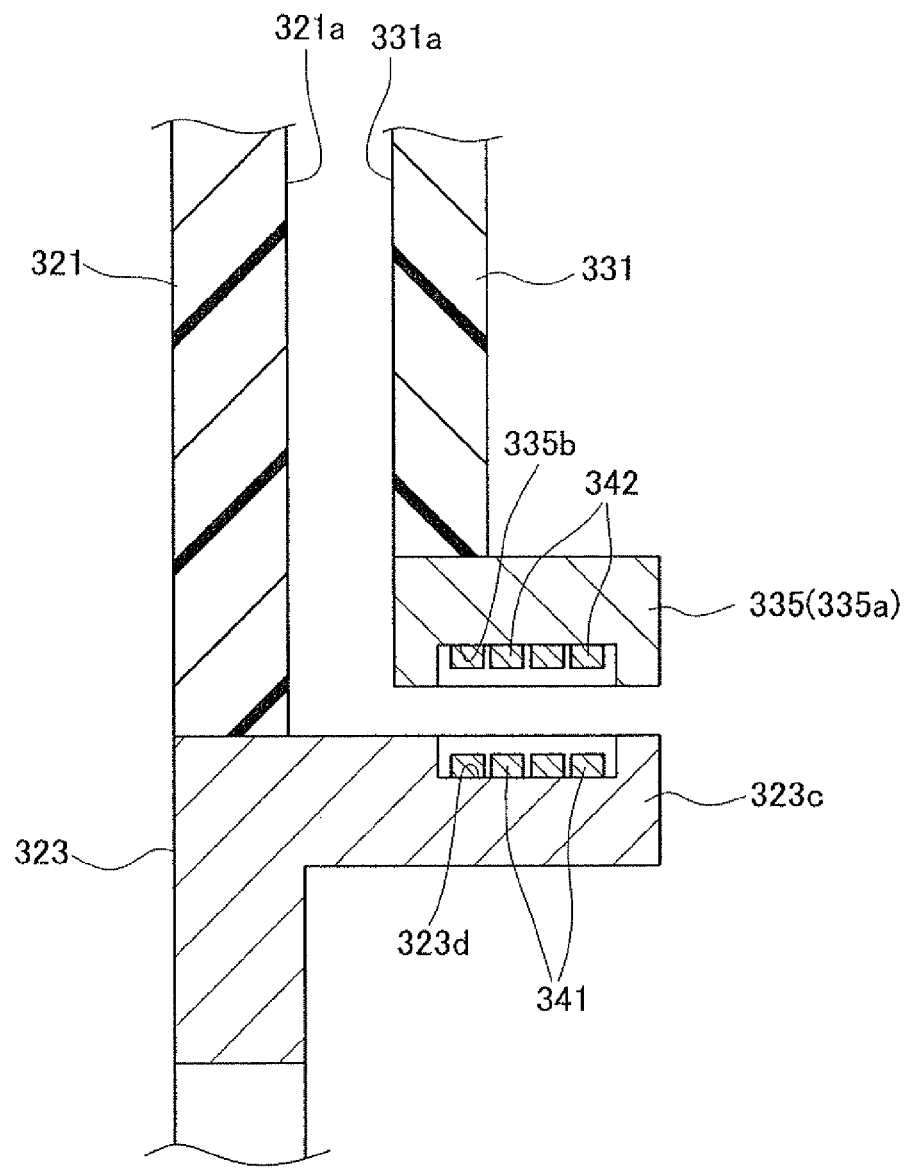
FIG. 27 is an enlarged cross sectional view showing a section of the angle sensor encircled by a chain line in FIG. 24 in the second embodiment.

FIG. 27 is an enlarged cross sectional view showing a part of the angle sensor 301 indicated by a chain-line circle S1 in FIG. 24. As shown in FIG. 27, the annular facing portion 323c of the rotor-side annular metal member 323 and the annular facing portion 335a of the stator-side annular metal member 335 are placed to face each other with a gap therebetween. In respective facing surfaces of the annular facing portions 323c and 335a, coils 341 and 342 for rotary transformer are provided. To be specific, the annular facing portions 323c and 335a are respectively formed with grooves 323d and 335b in a circumferential direction. In the grooves 323d and 335b, the coils 341 and 342 for rotary transformer are respectively disposed. In other words, the coils 341 and 342 for rotary transformer are respectively placed and enclosed in the grooves 323d and 335b.

Figure 28:
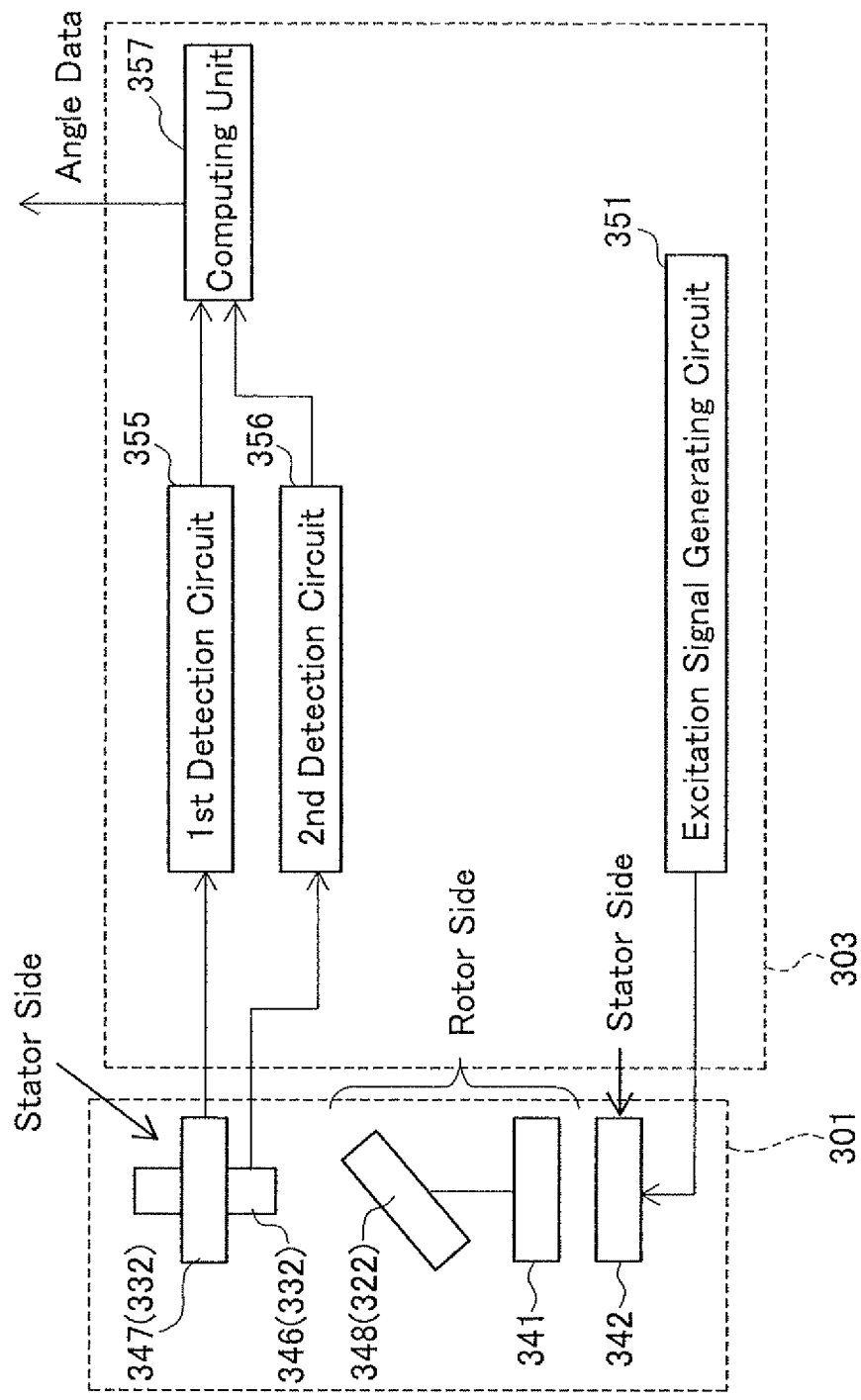
FIG. 28 is a block circuit diagram showing an electric configuration of the angle sensor in the second embodiment.

An electrical configuration for the aforementioned angle sensor 301 is explained below. FIG. 28 is a block circuit diagram showing the electrical configuration for the angle sensor 301. As shown in FIG. 28, the angle sensor 301 is connected to a signal processing device 303. The angle sensor 301 includes a SIN signal excitation coil 347 and a COS signal excitation coil 346 constituting the planar coil 332 of the sensor stator 306, a sensor coil 348 constituting the planar coil 322 of the sensor rotor 307, the coil 341 for rotary transformer provided in the rotor-side annular metal member 323 of the sensor rotor 307, and the coil 342 for rotary transformer provided in the stator-side annular metal member 335 of the sensor stator 306.

As shown in FIG. 28, the signal processing device 303 includes an excitation signal generating circuit 351, a first detection circuit 355, a second detection circuit 356, and a computing unit 357. The excitation signal generating circuit 351 is configured to output an excitation signal (a SIN signal) of a high frequency (480 kHz) to the coil 342 for rotary transformer. The first detection circuit 355 is configured to receive a SIN signal output from the SIN signal excitation coil 347. The second detection circuit 356 is configured to receive a COS signal output from the COS signal excitation coil 346. The computing unit 357 is configured to receive a SIN signal and a COS signal respectively output from the first detection circuit 355 and the second detection circuit 356.

In the above signal processing device 303, when an excitation signal is generated in the excitation signal generating circuit 351, the excitation signal is input to the rotor-side sensor coil 348 through the stator-side rotary transformer coil 342 and the rotor-side rotary transformer coil 341. A magnetic flux generated by electric current of this excitation signal generates an electromotive force (a SIN signal and a COS signal) in the stator-side SIN signal excitation coil 347 and COS signal excitation coil 346. By analyzing amplitude variation of the electromotive force (SIN signal) generated in the SIN signal excitation coil 347 and amplitude variation of the electromotive force (COS signal) generated in the COS signal excitation coil 346, a rotational position of the sensor rotor 307 can be calculated. Specifically, the first detection circuit 355 removes high-frequency components of the excitation signal from the SIN signal generated in the SIN signal excitation coil 347. On the other hand, the second detection circuit 356 removes high-frequency components of the excitation signal from the COS signal generated in the COS signal excitation coil 346. The computing unit 357 then calculates a current angular position of the sensor rotor 307 based on a ratio in amplitude between the output signal of the first detection circuit 355 and the output signal of the second detection circuit 356, and outputs a calculation result thereof as angle data. Accordingly, in the angle sensor 301 of the present embodiment, a transmission efficiency of a detection signal between the paired rotary transformer coils 341 and 342 respectively provided in the sensor stator 306 and the sensor rotor 307 has an influence on sensor reliability.

According to the angle sensor 301 of the present embodiment explained above, the sensor rotor 307 is formed integrally including the rotor-side annular metal member 323 made of a magnetic material on the inner circumferential side of the rotor substrate 321, and the rotary transformer coil 341 is provided in the annular facing portion 323c of the annular metal member 323. Thus, the rotor-side annular metal member 323 also used as a core of the rotary transformer coil 341 is used to mount the sensor rotor 7 on the rotary shaft 314. The sensor stator 306 is formed integrally including the stator-side annular metal member 335 made of a magnetic material on the inner circumferential side of the stator substrate 331, and the rotary transformer coil 342 is provided in the annular facing portion 335a of the annular metal member 335. Therefore, it is unnecessary to take extra mounting works and wiring works to arrange the paired rotary transformer coils 341 and 342 separately from the sensor rotor 307 and the sensor stator 306. This can enhance the productivity of the angle sensor 301.

In the present embodiment, the annular facing portion 323c of the rotor-side annular metal member 323 of the sensor rotor 307 and the annular facing portion 335a of the stator-side annular metal member 335 of the sensor stator 306 face each other with a gap therebetween, so that the paired rotary transformer coils 341 and 342 face each other with a gap therebetween. Thus, the flow of magnetic flux occurring between the coils 341 and 342 is formed between the annular facing portions 323c and 335a. This makes it possible to prevent the magnetic flux from leaking from between both the rotary transformer coils 341 and 342 and reduce angle detection errors of the angle sensor 301. The angle sensor 301 can therefore provide high reliability.

In the present embodiment, in the sensor rotor 307 and the sensor stator 306, respectively, the rotary transformer coils 341 and 342 are enclosed in the grooves 323d and 335b of the annular facing portions 323c and 335a, so that the grooves 323d and 335b each form a magnetic closed circuit with respect to the magnetic flux generated in the rotary transformer coils 341 and 342. It is therefore possible to further prevent the magnetic flux from leaking from between the paired rotary transformer coils 341 and 342, increase an SN ratio of a detection signal transmitted between both the coils 341 and 342. The angle sensor 301 can therefore provide a high noise-resistance property.

<Third Embodiment>

A third embodiment of the angle sensor according to the present invention will be explained in detail below referring to accompanying drawings.

Figure 29:
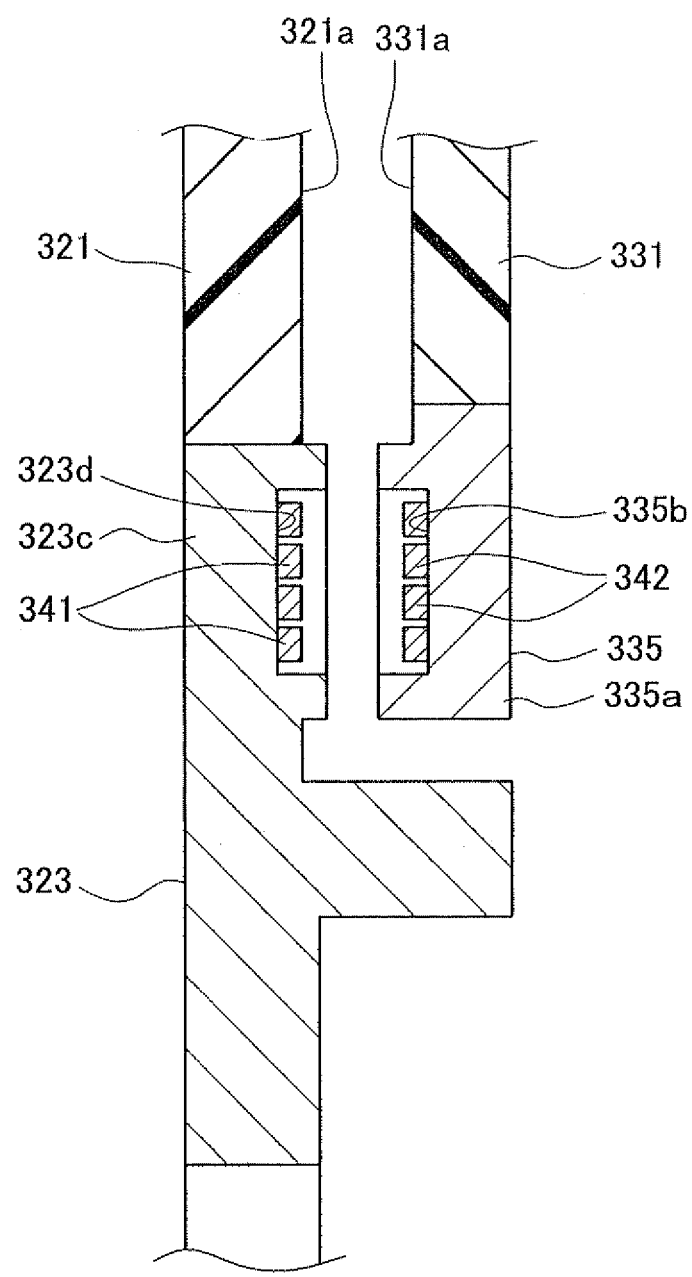
FIG. 29 is an enlarged cross sectional view showing a part of an angle sensor in a third embodiment, corresponding to FIG. 27.

FIG. 29 is an enlarged cross sectional view showing a part of the angle sensor of the third embodiment, corresponding to FIG. 27. This embodiment differs from the second embodiment in the arrangement of each of annular facing portions 323c and 335a. Specifically, in a rotor-side annular metal member 323, the annular facing portion 323c is provided in a portion near the outer circumferential edge of the metal member 323. In the annular facing portion 323c, its one surface in an axial direction (on the same side as the main surface 321a of the rotor substrate 321) is formed with a groove 323d in which the rotary transformer coil 341 is disposed. On the other hand, in the stator-side annular metal member 335, the annular facing portion 335a is placed in a position facing the annular facing portion 323c of the above rotor-side annular metal member 323. In the annular facing portion 335b, its one side surface in the axial direction (on the same side as the main surface 331a of the stator substrate 331) is formed with a groove 335b in which the rotary transformer coil 342 is disposed. In this configuration, the grooves 323d and 335b are each formed in an annular shape having the same radius, and the coils 341 and 342 respectively disposed in the grooves 323d and 335b are each formed in an annular shape having the same radius.

Consequently, the angle sensor of the present embodiment can also provide the same operations and effects as the angle sensor 301 of the second embodiment.

The present invention is not limited to the above embodiments and may be embodied in other specific forms without departing from the essential characteristics thereof.

Figure 30:
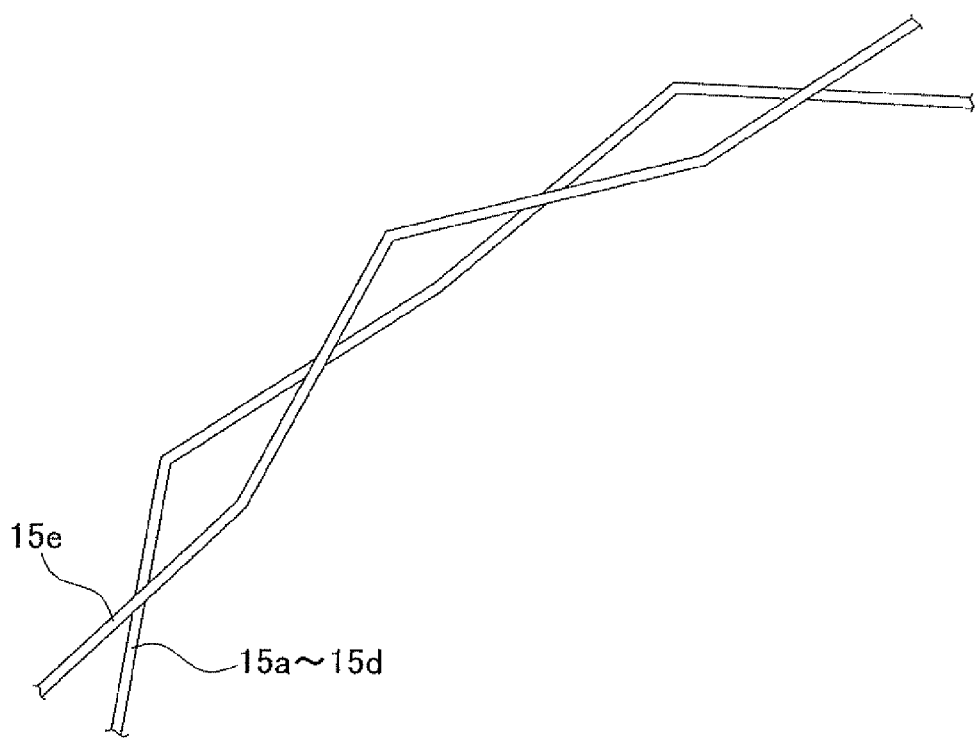
FIG. 30 is an enlarged plan view showing arrangement of parts of connecting wires in another embodiment.

For instance, in the first embodiment, the connecting wire 15 of the SIN signal detection coil 10 is configured so that the turn-back connecting wire (the second-end connecting wire) 15e and the other connecting wires 15a-15d are arranged to overlap one above the other in parallel while the second insulation layer 4 is interposed therebetween. As an alternative, as shown in FIG. 30 which is an enlarged plan view showing the arrangement of a part of the connecting wires 15a-15e, the turn-back connecting wire (the second-end connecting wire) 15e may be arranged in a zigzag manner to intersect the other connecting wire 15a-15d by the even number so that the connecting wires alternately change their extending directions while the second insulation layer 4 (see FIG. 3) is interposed between the turn-back connecting wire and each other connecting wire. In this case, the turn-back connecting wire (the second-end connecting wire) 15e and the other connecting wire 15a-15d are arranged to intersect each other by alternately changing their extending directions in a zigzag manner. Thus, the space between both the connecting wire 15e and each connecting wire 15a-15d is small, allowing external electromagnetic noise to cancel out each other more efficiently. Accordingly, the connecting wires 15a-15e can be made more hard to be affected by the external electromagnetic noise. The same applies to the connecting wires 25 of the COS signal detection coil 20.

In the first embodiment, the SIN first coils 11A-11D and the SIN fourth coils 14A-14D are formed in the first coil layer 3, while the SIN second coils 12A-12D and the SIN third coils 13A-13D are formed in the second coil layer 5. Alternatively, it may be configured such that the SIN first coils 11A-11D and the SIN fourth coils 14A-14D are formed in the second coil layer 5, while the SIN second coils 12A-12D and the SIN third coils 13A-13D are formed in the first coil layer 3.

In the first embodiment, the COS first coils 21A-21D and the COS fourth coils 24A-24D are formed in the first coil layer 3, while the COS second coils 22A-22D and the COS third coils 23A-23D are formed in the second coil layer 5. Alternatively, it may be configured so that the COS first coils 21A-21D and the COS fourth coils 24A-24D are formed in the second coil layer 5, while the COS second coils 22A-22D and the COS third coils 23A-23D are formed in the first coil layer 3.

Although the first embodiment explains the revolver of one-excitation and two-output type, the present invention may be applied to a resolver of two-excitation and one-output type.

In the second and third embodiments, the annular facing portions 323c and 335a are formed with the grooves 323d and 335b. Alternatively, these grooves 323d and 335b may be omitted.

Industrial Applicability

The present invention is utilizable for detection of rotation angle of a rotary shaft of a motor, an engine, or others.

The invention claimed is:

1. An angle sensor comprising:
a sensor rotor to be mounted on a rotary shaft and having a surface on which a planar coil is formed; and
a sensor stator placed with a surface facing the surface of the sensor rotor,
wherein the sensor stator includes:
a stator substrate;
a plurality of forward-direction planar coils each wound in a spiral form in a forward direction and a plurality of reverse-direction planar coils each wound in a spiral form in a reverse direction opposite to the forward direction, the forward-direction planar coils and the reverse-direction planar coils being formed on the stator substrate and electrically connected so that the reverse-direction planar coils are in opposite phase to the forward-direction planar coils;
a positive terminal and a negative terminal provided to be connectable to an external device; and
connecting wires including a turn-back connecting wire and other connecting wires,
wherein the forward-direction planar coils and the reverse-direction planar coils are respectively alternately arranged in a circumferential direction and connected in series through the connecting wires to form a series of planar coils having a first end and a second end, the first end being connected to the positive terminal through the other connecting wires and the second end being connected to the negative terminal through the turn-back connecting wire, and
wherein the connecting wires are placed along circumferential arrangement of the series of planar coils but in a range less than a full circle of the circumferential arrangement, and the turn-back connecting wire connected to the second end of the series of planar coils is placed to extend from the second end along the other connecting wires and connected to the positive terminal or negative terminal.

2. The angle sensor according to claim 1, wherein the turn-back connecting wire and the other connecting wires are placed adjacent to and radially outside the series of planar coils.

3. The angle sensor according to claim 2, wherein the turn-back connecting wire and the other connecting wires are arranged to overlap one above the other in parallel while an insulation layer is interposed between the turn-back connecting wire and the other connecting wires.

4. The angle sensor according to claim 2, wherein the turn-back connecting wire is arranged to intersect the other connecting wires in a zigzag manner so that the turn-back connecting wire and the other connecting wires alternately change their extending directions while an insulation layer is interposed between the turn-back connecting wire and the other connecting wires.

5. An angle sensor comprising:
a sensor rotor to be mounted on a rotary shaft and having a surface on which a planar coil is formed; and
a sensor stator having a surface on which a planar coil is formed, the sensor stator being placed with the surface facing the surface of the sensor rotor,
wherein the sensor stator includes:
a stator substrate;
a plurality of forward-direction planar coils each wound in a spiral form in a forward direction and a plurality of reverse-direction planar coils each wound in a spiral form in a reverse direction opposite to the forward direction, the forward-direction planar coils and the reverse-direction planar coils being arranged in a circumferential direction on the stator substrate and electrically connected so that the reverse-direction planar coils are in opposite phase to the forward-direction planar coils; and
connecting wires,
wherein the forward-direction planar coils and the reverse-direction planar coils are symmetric about a symmetry axis extending in a radial direction by passing a center in a circumferential direction, each of the planar coils including a first end and a second end,
wherein the forward-direction planar coils and the reverse-direction planar coils are connected in series through the connecting wires, and the first end and the second end of each of the planar coils connected in series are located on the symmetry axis.

6. The angle sensor according to claim 5, wherein each of the planar coils connected in series is configured so that the first end is located inside the planar coil and the second end is located outside the planar coil, each planar coil consists of a coil wire group, and arrangement of the coil wire group is displaced between the first end and the second end and in the radial direction so that the arrangement of the coil wire group is symmetric about the symmetry axis.

7. The angle sensor according to claim 5, wherein the connecting wires are placed on an outer circumferential side of each of the planar coils connected in series, each planar coil includes a first bridging wire extending in the radial direction from the first end to the connecting wire and a second bridging wire extending in the radial direction from the second end to the connecting wire, and the first bridging wire and the second bridging wire are arranged to overlap one above the other while an insulation layer is interposed between the first and second bridging wires.

8. The angle sensor according to claim 6, wherein the connecting wires are placed on an outer circumferential side of each of the planar coils connected in series, each planar coil includes a first bridging wire extending in the radial direction from the first end to the connecting wire and a second bridging wire extending in the radial direction from the second end to the connecting wire, and the first bridging wire and the second bridging wire are arranged to overlap one above the other while an insulation layer is interposed between the first and second bridging wires.

9. An angle sensor comprising:
a sensor rotor including an annular rotor substrate having a surface on which a planar coil is formed, a rotor-side annular metal member provided on an inner circumferential side of the rotor substrate, the sensor rotor being mounted on a rotary shaft through the rotor-side annular metal member; and
a sensor stator including a stator substrate having a surface on which a planar coil is formed, the stator substrate being placed so that the surface faces the surface of the sensor rotor, and a stator-side annular metal member provided on an inner circumferential side of the stator substrate,
wherein each of the rotor-side annular metal member and the stator-side annular metal member is made of a magnetic material and formed with an annular facing portion, the annular facing portions of the rotor-side annular metal member and the stator-side annular metal member facing each other with a gap between the annular facing portions, each including a rotary transformer coil for signal transmission.

10. The angle sensor according to claim 9, wherein each of both the annular facing portions is formed with a groove extending in a circumferential direction, the rotary transformer coils being placed respectively in the grooves.

* * * * *